United States Patent [19]
Sagawa et al.

[11] Patent Number: 5,699,441
[45] Date of Patent: Dec. 16, 1997

[54] CONTINUOUS SIGN-LANGUAGE RECOGNITION APPARATUS AND INPUT APPARATUS

[75] Inventors: Hirohiko Sagawa, Kokubunji, Japan; Masahiro Abe, Dublin, Ireland

[73] Assignee: Hitachi, Ltd., Tokyo, Japan

[21] Appl. No.: 716,911

[22] Filed: Sep. 9, 1996

Related U.S. Application Data

[63] Continuation of Ser. No. 248,456, May 24, 1994, abandoned, which is a continuation-in-part of Ser. No. 111,380, Aug. 24, 1993, abandoned, which is a continuation-in-part of Ser. No. 29,046, Mar. 9, 1993, Pat. No. 5,473,705.

[30] Foreign Application Priority Data

| Mar. 10, 1992 | [JP] | Japan | 4-051300 |
| Aug. 24, 1992 | [JP] | Japan | 4-247285 |
| Sep. 3, 1992 | [JP] | Japan | 4-235633 |
| May 27, 1993 | [JP] | Japan | 5-125698 |

[51] Int. Cl.$^6$ ........................ G06K 9/00
[52] U.S. Cl. ............... 382/100; 382/190; 382/209
[58] Field of Search ............... 382/100, 181, 382/215, 190, 207, 209; 395/2.5, 2.8; 341/20, 21; 434/112

[56] References Cited

U.S. PATENT DOCUMENTS

| 4,414,537 | 11/1983 | Grimes | 341/20 |
| 5,047,952 | 9/1991 | Kramer et al. | 395/2.8 |

FOREIGN PATENT DOCUMENTS

| 510632 | 10/1992 | European Pat. Off. |
| 585098 | 3/1994 | European Pat. Off. |
| 58-165182 | 9/1983 | Japan |
| 2-144675 | 6/1990 | Japan |
| 3-186979 | 8/1991 | Japan |
| 4-298795 | 10/1992 | Japan |
| WO92/11619 | 7/1992 | WIPO |

OTHER PUBLICATIONS

"Gesture Recognition Using Recurrent Neural Networks", in 43rd National Conference of Institute of Information Processing Engineers of Japan, IS-3, 1992, Hitomi Ushiyama, Katsuhiko Hirota and Kouichi Murakami, pp. 187-190.

"Sign Language Interpretation Using Continuous DP Matching", in the Human Interface Study Group in Institute of Information Processing Engineers of Japan, 44-12, 1992, Hirohiko Sagawa, Hiroshi Sakou and Masahiro Abe, pp. 87-94.

T. Takahashi et al, "A Hand Gesture Recognition Method and Its Application", System & Computers in Japan, vol. 23, No. 3, 1992, pp. 38-48, and Denshi Joho Tsushin Gakkai Ronbunshi, vol. 73-D-II, No. 12, Dec. 1990, pp. 1985-1992, original publication, source of translation.

K. Murakami et al, "Gesture Recognition Using Recurrent Neural Networks", Reaching Through Technology—CHI '91 Conference Record, 1991, pp. 237-242.

(List continued on next page.)

*Primary Examiner*—Leo Boudreau
*Assistant Examiner*—Phuoc Tran
*Attorney, Agent, or Firm*—Fay, Sharpe, Beall, Fagan, Minnich & McKee

[57] ABSTRACT

A continuous sign-language recognition apparatus and input apparatus which employ expressions of template patterns of sign-language word as well as the template patterns of sign-language word to realize high speed and highly accurate sign-language recognition. Each of component patterns constituting a template pattern of a sign-language word is expressed by a feature vector representing the pattern when the pattern is a static pattern, or by a time-series pattern of a feature vector when the pattern is a dynamic pattern. Also, using the template patterns of sign-language word, different matching methods are applied to the static and dynamic patterns for recognizing each component pattern, and the respective results are integrated on the basis of a temporal overlap of the respective component patterns to continuously recognize sign-language words.

18 Claims, 24 Drawing Sheets

OTHER PUBLICATIONS

S. Sidney Fels et al, "Glove Talk: A Neural Network Interface Between a Data–Glove and a Speech Synthesizer", IEEE Transactions on Neural Networks, vol. 4, No. 1, Jan. 1993, pp. 2–8.

Tomoichi Takahashi and Fumio Kishino, "A Hand Gesture Recognition Method and Its Application", System & Computer In Japan, vol. 23, No. 3, 1992, New York US, pp. 38–48, and Denshi Joho Tsushin Gakkai Ronbunshi, vol. 73–D–II, No. 12, Dec. 1990, pp. 1985–1992, Original Publication, Source of translation.

FIG.3

| WORD NAME | | | | 31 |
|---|---|---|---|---|
| NUMBER OF MORPHEMES | | | | 32 |
| 33 / MORPHEME 1 | 34 POSITION OF HAND | 37a RIGHT HAND | KIND OF PATTERN | 38a |
| | | | PATTERN DATA | 38b |
| | | 37b LEFT HAND | KIND OF PATTERN | |
| | | | PATTERN DATA | |
| | 35 DIRECTION OF PALM | RIGHT HAND | KIND OF PATTERN | |
| | | | PATTERN DATA | |
| | | LEFT HAND | KIND OF PATTERN | |
| | | | PATTERN DATA | |
| | 36 FIGURE OF HAND | RIGHT HAND | KIND OF PATTERN | |
| | | | PATTERN DATA | |
| | | LEFT HAND | KIND OF PATTERN | |
| | | | PATTERN DATA | |
| ⋮ | | | | |
| MORPHEME n | | | | |

KIND OF PATTERN : "STATIC" OR "DYNAMIC"
PATTERN : VECTOR WHEN STATIC
TIME SEQUENTIAL VECTOR WHEN DYNAMIC

FIG.4A
SIGN-LANGUAGE WORD "PEOPLE"
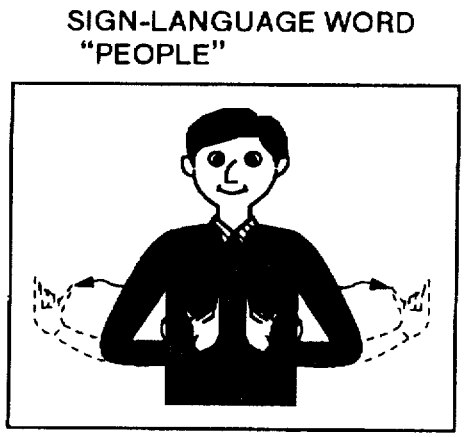
FIG.4B
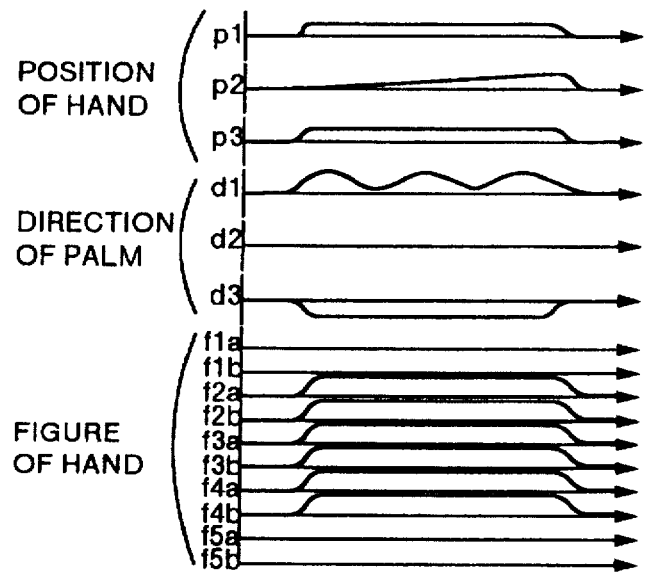
FIG.4C
| WORD NAME | PEOPLE | | | |
|---|---|---|---|---|
| NUMBER OF MORPHEMES | 1 | | | |
| MORPHEME 1 | POSITION OF HAND | RIGHT HAND | DYNAMIC | |
| | | | p1 p2 p3 | |
| | | LEFT HAND | DYNAMIC | |
| | | | p1 p2 p3 | |
| | DIRECTION OF PALM | RIGHT HAND | DYNAMIC | |
| | | | d1 d2 d3 | |
| | | LEFT HAND | DYNAMIC | |
| | | | d1 d2 d3 | |
| | FIGURE OF HAND | RIGHT HAND | STATIC | |
| | | | f1a f1b f2a f2b f3a f3b f4a f4b f5a f5b | |
| | | LEFT HAND | STATIC | |
| | | | f1a f1b f2a f2b f3a f3b f4a f4b f5a f5b | |

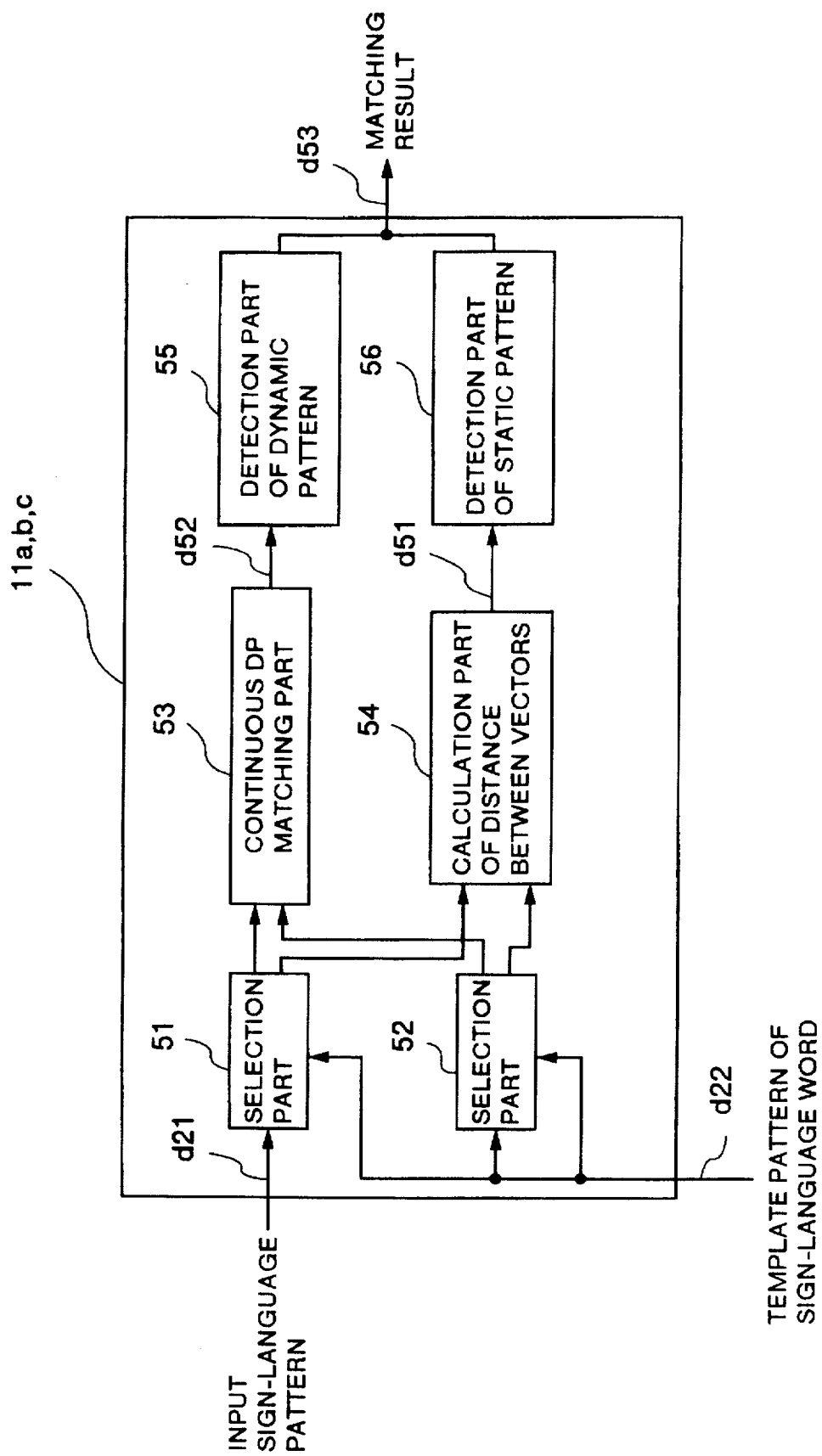

SIGN-LANGUAGE WORD
"TO THINK WHILE WALKING"

TEMPLATE PATTERN OF
SIGN-LANGUAGE WORD

FIG.14

| WORD NAME | | | | |
|---|---|---|---|---|
| NUMBER OF MORPHEMES | | | | |
| MORPHEME 1 | POSITION OF HAND | RIGHT HAND | KIND OF PATTERN | ~141 |
| | | | PATTERN DATA | ~142 |
| | | | ADDITIONAL INFORMATION | ~143 |
| | | LEFT HAND | KIND OF PATTERN | |
| | | | PATTERN DATA | |
| | | | ADDITIONAL INFORMATION | |
| | DIRECTION OF PALM | RIGHT HAND | KIND OF PATTERN | |
| | | | PATTERN DATA | |
| | | | ADDITIONAL INFORMATION | |
| | | LEFT HAND | KIND OF PATTERN | |
| | | | PATTERN DATA | |
| | | | ADDITIONAL INFORMATION | |
| | FIGURE OF HAND | RIGHT HAND | KIND OF PATTERN | |
| | | | PATTERN DATA | |
| | | | ADDITIONAL INFORMATION | |
| | | LEFT HAND | KIND OF PATTERN | |
| | | | PATTERN DATA | |
| | | | ADDITIONAL INFORMATION | |
| ⋮ | | | | |
| MORPHEME | | | | |

FIG.22A

| WORD NAME |
| --- |
| NUMBER OF MORPHEMES |
| MORPHEME NAME 1 |
| ⋮ |
| MORPHEME NAME n |

FIG.22B

| MORPHEME NAME | | |
| --- | --- | --- |
| POSITION OF HAND | RIGHT HAND | KIND OF PATTERN |
| | | PATTERN DATA |
| | LEFT HAND | KIND OF PATTERN |
| | | PATTERN DATA |
| DIRECTION OF PALM | RIGHT HAND | KIND OF PATTERN |
| | | PATTERN DATA |
| | LEFT HAND | KIND OF PATTERN |
| | | PATTERN DATA |
| FIGURE OF HAND | RIGHT HAND | KIND OF PATTERN |
| | | PATTERN DATA |
| | LEFT HAND | KIND OF PATTERN |
| | | PATTERN DATA |

FIG.27

| | | | | |
|---|---|---|---|---|
| COMMAND NAME | | | | 271 |
| NUMBER OF GESTURES | | | | 272 |
| 273 / GESTURE 1 | 274 POSITION OF HAND | RIGHT HAND | KIND OF PATTERN | 277 |
| | | | PATTERN DATA | 278 |
| | | | ADDITIONAL INFORMATION | 279 |
| | | LEFT HAND | KIND OF PATTERN | |
| | | | PATTERN DATA | |
| | | | ADDITIONAL INFORMATION | |
| | 275 DIRECTION OF PALM | RIGHT HAND | KIND OF PATTERN | |
| | | | PATTERN DATA | |
| | | | ADDITIONAL INFORMATION | |
| | | LEFT HAND | KIND OF PATTERN | |
| | | | PATTERN DATA | |
| | | | ADDITIONAL INFORMATION | |
| | 276 FIGURE OF HAND | RIGHT HAND | KIND OF PATTERN | |
| | | | PATTERN DATA | |
| | | | ADDITIONAL INFORMATION | |
| | | LEFT HAND | KIND OF PATTERN | |
| | | | PATTERN DATA | |
| | | | ADDITIONAL INFORMATION | |
| ⋮ | | | | |
| GESTURE n | | | | |

KIND OF PATTERN : "STATIC" OR "DYNAMIC"
PATTERN : VECTOR WHEN STATIC
TIME SEQUENTIAL VECTOR WHEN DYNAMIC

FIG. 28A

EXAMPLE OF COMMAND "COMMAND A"

FIG. 28B

| COMMAND NAME | COMMAND A | | | | |
|---|---|---|---|---|---|
| NUMBER OF GESTURES | 1 | | | | |
| GESTURE 1 | POSITION OF HAND | RIGHT HAND | KIND OF PATTERN | DYNAMIC | |
| | | | PATTERN DATA | p0 p1 p2 | |
| | | | ADDITIONAL INFORMATION | | |
| | | LEFT HAND | | | |
| | DIRECTION OF PALM | RIGHT HAND | KIND OF PATTERN | STATIC | |
| | | | PATTERN DATA | d1 d2 d3 | |
| | | | ADDITIONAL INFORMATION | | |
| | | LEFT HAND | | | |
| | FIGURE OF HAND | RIGHT HAND | KIND OF PATTERN | STATIC | |
| | | | PATTERN DATA | f1a f1b f2a f2b f3a f3b f4a f4b f5a f5b | |
| | | | ADDITIONAL INFORMATION | | |
| | | LEFT HAND | | | |

FIG.29A

EXAMPLE OF COMMAND "COMMAND B"

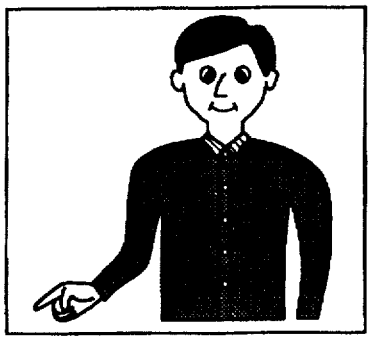

FIG.29B

| COMMAND NAME | COMMAND B | | | |
|---|---|---|---|---|
| NUMBER OF GESTURES | 1 | | | |
| GESTURE 1 | POSITION OF HAND | RIGHT HAND | KIND OF PATTERN | |
| | | | PATTERN DATA | |
| | | | ADDITIONAL INFORMATION | POSITION |
| | | LEFT HAND | | |
| | DIRECTION OF PLAM | RIGHT HAND | KIND OF PATTERN | |
| | | | PATTERN DATA | |
| | | | ADDITIONAL INFORMATION | DIRECTION OF FINGER |
| | | LEFT HAND | | |
| | FIGURE OF HAND | RIGHT HAND | KIND OF PATTERN | STATIC |
| | | | PATTERN DATA | f1a f1b f2a f2b f3a f3b f4a f4b f5a f5b |
| | | | ADDITIONAL INFORMATION | |
| | | LEFT HAND | | |

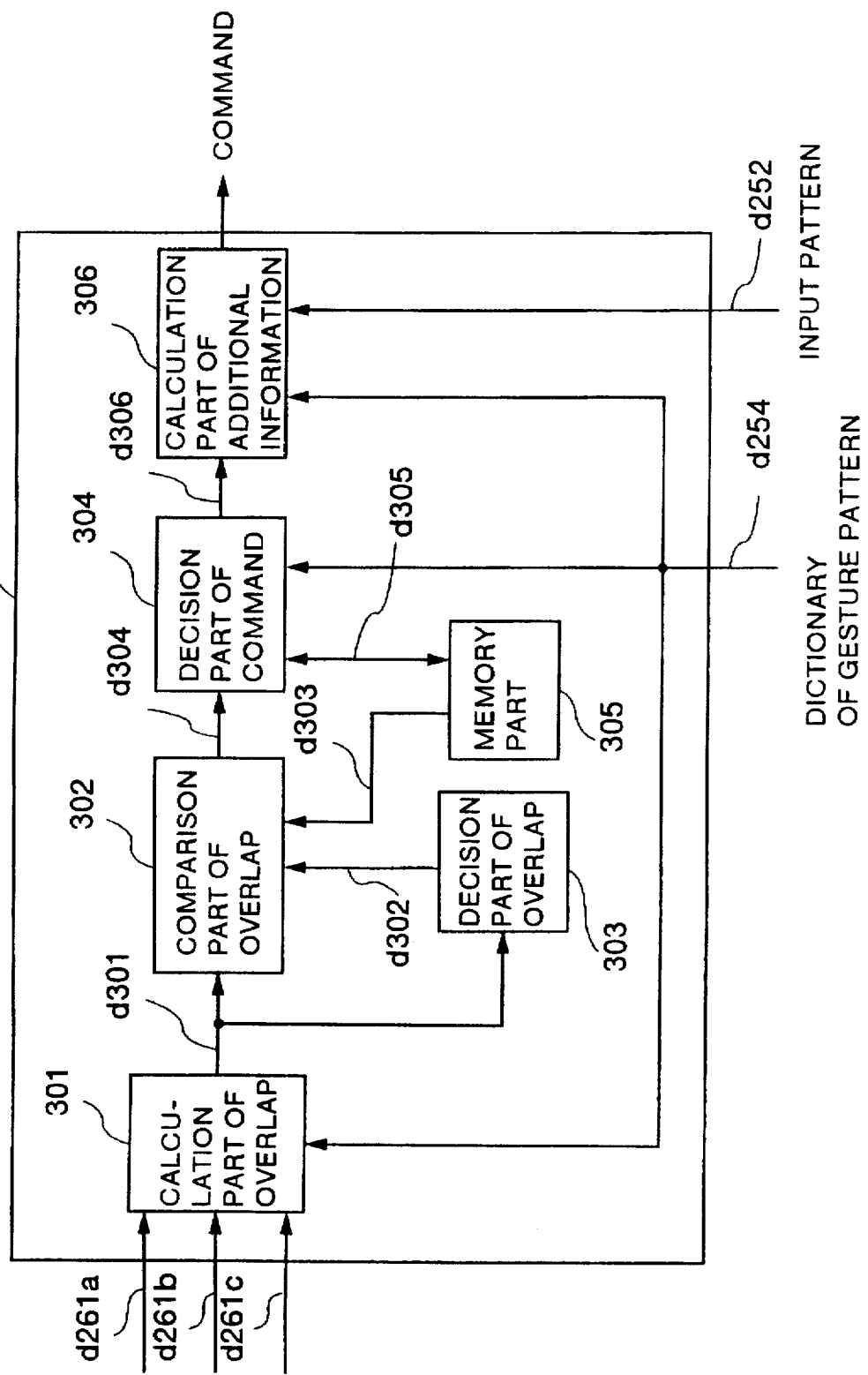

CONTINUOUS SIGN-LANGUAGE RECOGNITION APPARATUS AND INPUT APPARATUS

This is a continuation application of Ser. No. 08/248,456, filed May 24, 1994, now abandoned, which is a continuation-in-part of Ser. No. 08/111,380, filed Aug. 24, 1993, now abandoned, which is a continuation-in-part of Ser. No. 08/029,046, filed Mar. 9, 1993, now U.S. Pat. No. 5,473,705.

BACKGROUND AND SUMMARY OF THE INVENTION

The present invention relates to an expression of template patterns of sign-language word used in recognition based on the matching between continuous sign-language patterns, in which sign-language words are continuously coupled, and to the template patterns of sign-language word.

The present invention also relates to a continuous sign-language recognition apparatus which continuously recognizes sign-language words included in continuous sign-language patterns with a high accuracy and to an input apparatus for inputting a command or the like to a computer in a form of a gesture previously defined to the command.

Techniques related to the sign-language recognition have been proposed in "Hand Motion Recognition Apparatus and Sign Language Translation System" in JP-A-2-144675 (prior art example 1), "Hand Motion Recognition Method Using Neuro-computer" in JP-A-3-186979 (prior art example 2), "Gesture Recognition using a Time-Series Network" in 43th National Conference of Institute of Information Processing Engineers of Japan, IS-3, 1992 (prior art example 3), and "Sign Language Interpretation using Continuous DP Matching" in the Human Interface Study Group in Institute of Information Processing Engineers of Japan, 44-12, 1992 (prior art example 4).

The prior art examples 1 and 2 are intended to recognize finger spellings. The prior art example 1 utilizes colored gloves to detect a positional relation between fingers by an image recognition technique. The positional relation is matched with previously stored finger spelling patterns to recognize each finger spelling. The prior art example 2 recognizes data of finger spellings inputted from data gloves through a multi layer neural network. The prior art examples 3 and 4, in turn, are intended to recognize moving sign-language patterns or gestures. The prior art example 3 determines whether a gesture is dynamic or static by detecting the first pattern of a dynamic gesture through a multi layer neural network. Then, a motion is recognized through a recurrent type neural network from a starting point at which the first pattern is detected. A static gesture in turn is recognized through the multi layer neural network. In this manner, different recognition systems are used for dynamic gestures and static gestures. In the prior art example 4, sign-language word patterns inputted from data gloves are registered in the form of a dictionary of template pattern of sign-language, such that sign-language words are recognized by the continuous DP matching of sign-language sentence patterns inputted from the data gloves with the template patterns of sign-language word. The system employed in the prior art example 4 stores not only static patterns but also dynamic patterns as similar time-series patterns of feature vectors, and does not distinguish them for a recognition process also.

The sign-language patterns may be classified into dynamic patterns including motions and static patterns without motions. It is therefore desirable that storing methods and recognition methods appropriate to the respective patterns are employed in view of the storage capacity of a pattern dictionary, recognition accuracy and recognition speed. The prior art example 3 distinguishes static patterns and dynamic patterns and utilizes different recognition techniques for the static and dynamic patterns, wherein the static/dynamic distinction is made simply on the whole pattern. However, in the actual sign-language, it is often the case that only one component pattern, for example, "position of hand" is dynamic, whereas other component patterns are static, so that the static/dynamic distinction on a whole pattern will result in a low efficiency.

Also, the foregoing prior art stores a whole time-series vector pattern inputted from data gloves or the like as one pattern in the recognition of a sign-language pattern including motions. For this reason, all parameters associated to a feature vector at each time are used to carry out the recognition. However, a sign-language pattern may be broken down into relatively independent component patterns such as "position of hand", "direction of palm", "figure of hand", and so on. Further, all component patterns do not always characterize a sign-language pattern, but only part of the component patterns, in many cases, characterizes a sign-language pattern. For this reason, if a sign-language pattern having less important component patterns is to be recognized by the method of recognizing a sign-language pattern as a whole, the recognition accuracy may be degraded due to fluctuations of the component patterns. Furthermore, each component pattern does not necessarily change in synchronism with changes of other component patterns. On the contrary, in many cases the respective component patterns change at different times from each other. Therefore, the distinction only as to whether a whole sign-language word pattern is static or dynamic cannot attend to the degradation of the recognition accuracy caused by component pattern changes occurring at different timings.

Furthermore, the above-mentioned prior art distinguishes whether a sign-language pattern is static or dynamic in the pattern recognition by detecting a starting pattern of a dynamic pattern. However, as the number of words to be recognized is increased, many words may include similar motions. Thus, the method of distinguishing whether a pattern is dynamic or static by detecting a starting pattern of a dynamic pattern may easily cause erroneous recognition and therefore is not a satisfactory method.

It is a first object of the present invention to efficiently store template patterns of sign-language word for use in the sign-language recognition.

It is a second object of the present invention to provide a high speed sign-language recognition apparatus.

It is a third object of the present invention to provide a flexible and highly accurate sign-language recognition apparatus which is capable of attending to fluctuations and displacements in particular component patterns, and is applicable to static sign-language patterns as well as dynamic sign-language patterns.

It is a fourth object of the present invention to provide an input apparatus for inputting a command to a computer in a form of a gesture previously defined to the command.

The present invention classifies each of component patterns constituting a template pattern of sign-language word, such as "position of hand", "direction of palm", "figure of hand", and so on, into a static pattern and a dynamic pattern. Then, each of the component patterns is stored based on the classification, i.e., in the form of a feature vector representing the pattern if it is a static pattern or in the form of time-series pattern of a feature vector if it is a dynamic pattern.

Also, the present invention employs different recognition methods depending on whether each component pattern constituting a template pattern of sign-language word is static or dynamic. Specifically, a static component pattern is recognized by matching the same with feature vectors, while a dynamic component pattern is recognized by matching the same with time-series vectors. In the matching, static patterns as well as dynamic patterns are all matched in parallel so as to determine from the matching results which pattern is most effective.

Further, the present invention, after determining whether each of component patterns constituting a template pattern of sign-language word is static or dynamic, integrates the results based on a temporally overlapping portion of the component patterns so as to recognize a sign-language word.

For making a dictionary of template pattern of sign-language word, the respective component patterns constituting a template pattern of sign-language word are classified into a static pattern and a dynamic pattern. A static pattern is expressed by a single feature vector representing the pattern to reduce the storage capacity required to store the template patterns of sign-language word and to permit efficient storage of them.

Each of constituent component patterns in the template patterns of sign-language word is classified into a static pattern and a dynamic pattern, and different recognition methods are employed for the static component pattern and the dynamic component pattern, respectively, whereby a recognition time can be made shorter than for a recognition process using a single method for matching a whole pattern.

Further, the component patterns of a sign-language word are separately matched with the corresponding component patterns constituting each template pattern of sign-language word, and the matching results are integrated to recognize the sign-language word, thus flexibly attending to a degradation in the recognition accuracy due to displacements in the respective component patterns and largely fluctuating component patterns. Also, since the most effective pattern is determined after all static and dynamic patterns are simultaneously matched, erroneous static/dynamic pattern recognition is largely reduced, with the result that the recognition accuracy can be improved for the sign-language words.

By applying the method of recognizing sign-language words as described above to an input apparatus for a computer, user's instructions, i.e., symbols and commands can be inputted to a computer by previously defined gestures.

BRIEF DESCRIPTION OF THE DRAWINGS

FIG. 3 is a table showing a format of template pattern of sign-language word stored in a dictionary 23 of template pattern of sign-language word;

FIG. 4A shows a sign-language word representing "people";

FIG. 4B shows patterns of the sign-language word "people" converted by data gloves 21;

FIG. 4C shows patterns of the sign-language word "people" which is stored in the dictionary 23 of template pattern of sign-language word;

FIG. 5 is a block diagram showing the configuration of pattern matching parts 11a, 11b, 11c;

FIGS. 11A, 11B schematically show an overlap of component patterns when all the component patterns are static, wherein FIG. 11A is an example of the component patterns which are regarded as being overlapping, and FIG. 11B is an example of the component patterns which are regarded as not being overlapping;

FIG. 14 is a table showing a format of a dictionary 23 of template pattern of sign-language which is additionally provided with descriptions of context dependent patterns as additional information;

FIG. 22A shows a format of a dictionary 214 of sign-language word;

FIG. 22B shows a format of a dictionary 212 of morpheme pattern;

FIG. 27 is a table showing a format of a gesture pattern stored in a dictionary 254 of gesture pattern;

FIGS. 28A, 28B show an example of a command which does not have additional information;

FIGS. 29A, 29B show an example of a command which has additional information; and FIG. 30 is a block diagram showing the configuration of a detection part 262 of gesture.

DESCRIPTION OF THE PREFERRED EMBODIMENTS

The present invention will hereinafter be described with reference to FIGS. 1–13 in connection with an embodiment in which the invention is applied to a continuous sign-language recognition apparatus.

Figure 2:
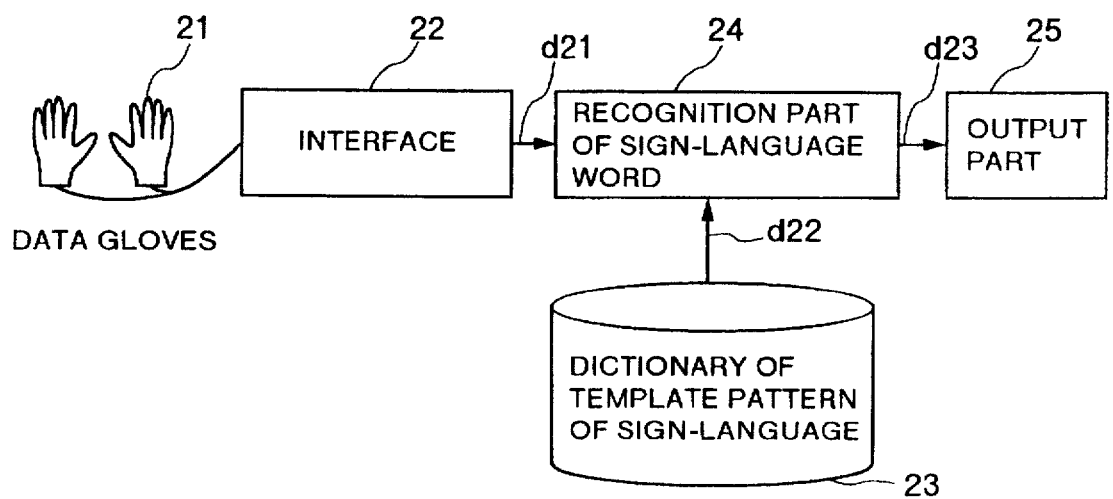
FIG. 2 is a block diagram showing a system for realizing the continuous sign-language recognition.

A block diagram of the whole configuration of a continuous sign-language recognition system is shown in FIG. 2. Reference numeral 21 designates a pair of data gloves (Data Glove is a registered trade mark of VPL Research Lab., U.S.A.) for inputting a sign-language to the system. A sign-language input operator wears the data gloves 21 on his hands and "talks" a sign-language, with the result that the sign-language is inputted to the system. Reference numeral 22 designates an interface for converting an inputted sign-language word into a time-series continuous pattern of n-th order vector. With this interface 22, a sign-language pattern inputted by the data glove 21 is converted into time-series continuous sign-language patterns of n-th order vector which represent the position of hand, direction of palm, and figure of hand, respectively. For example, a sign-language word "people" as shown in FIG. 4A is converted into time-series patterns as shown in FIG. 4B. In FIG. 4B, patterns p1–p3 are data representing the position of hand; d1–d3 the direction of palm; and f1a–f5b the figure of hand, respectively. It should be noted that FIG. 4B only shows data on the right hand. Reference numeral 23 designates a dictionary of template pattern of sign-language for storing template patterns of sign-language word for the recognition of inputted sign-language patterns. Reference numeral 24 designates a recognition part of sign-language word for matching an inputted sign-language pattern with template patterns of sign-language word to recognize a sign-language word expressed in the inputted sign-language pattern. Reference numeral 25 designates an output part for outputting candidates of the sign-language word recognized by the recognition part 24.

Next, a format of the template pattern of sign-language word registered in the dictionary 23 of template pattern of sign-language will be explained in detail with reference to FIG. 3. The template pattern of sign-language word consists of a word name 31 corresponding to a sign-language word pattern associated therewith, a number of morphemes 32 constituting the pattern, and component patterns 33 of the respective morphemes. The morpheme is herein defined as a minimal unit having a meaning in patterns constituting a sign-language word pattern. Stated another way, the morpheme corresponds to "a word of the sign-language". However, since the morpheme does not correspond on a one-to-one basis with the word in the natural language, it is assumed that a series of morphemes constitute a word. Further, a morpheme consists of three kinds of component patterns which are "position of hand" 34, "direction of palm" 35 and "figure of hand" 36, where each of the component patterns includes right hand data 37a and left hand data 37b. Further, the kind of pattern 38a and pattern data 38b are stored for each hand. The kind of pattern 38a represents whether an associated component pattern is a static pattern or a dynamic pattern. For a static pattern, an n-th order vector representative of the component pattern is stored as the pattern data 38b, while for a dynamic pattern, a time-series pattern of n-th order vector is stored. For example, a sign-language word shown in FIG. 4A may be expressed by patterns and data as shown in FIG. 4C. Thus, the patterns in the format as illustrated are stored for each sign-language word in the dictionary 23 of template pattern of sign-language. The break-down of a sign-language word pattern into morphemes and the registration of the morphemes in the dictionary may be readily achieved by manually extracting patterns representing a sign-language word inputted by the data gloves. However, since the morpheme is not clearly defined in the knowing sign-language, how to break down an inputted sign-language word into morphemes is dependent on the determination of the registration operator.

In order to improve the recognition accuracy, additional parameters such as changing speed, direction of change, acceleration, and so on may be added to the above-mentioned parameters representing the position of hand, direction of palm and figure of hand. Also, each parameter constituting a pattern vector may be classified as being static or dynamic for registering the sign-language word. Further, each component pattern or each parameter of a pattern vector may be multiplied with a weighting coefficient indicative of an importance degree thereof with respect to a whole sign-language pattern associated therewith. The weighting can be utilized particularly for determining whether a sign-language word is expressed by one hand or both hands.

Figure 1:
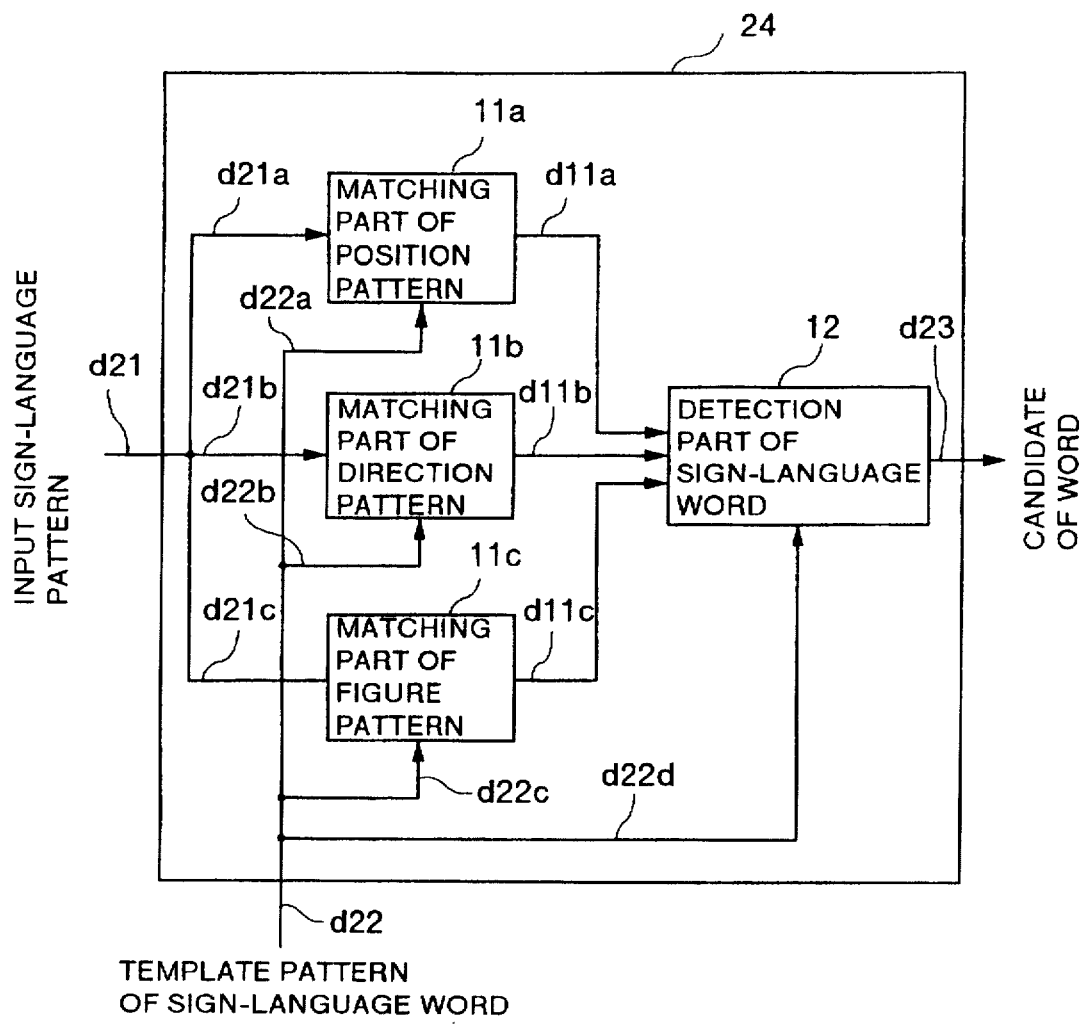
FIG. 1 is a block diagram showing the configuration of a recognition part 24 of sign-language word.
Figure 7:
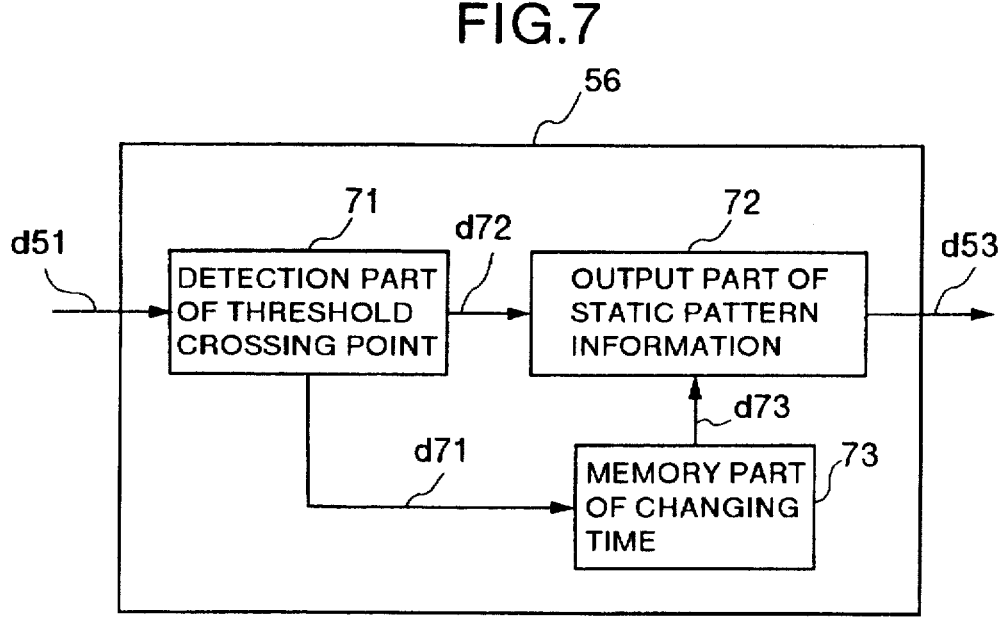
FIG. 7 is a block diagram showing the configuration of a detection part 56 of static pattern.
Figure 8:
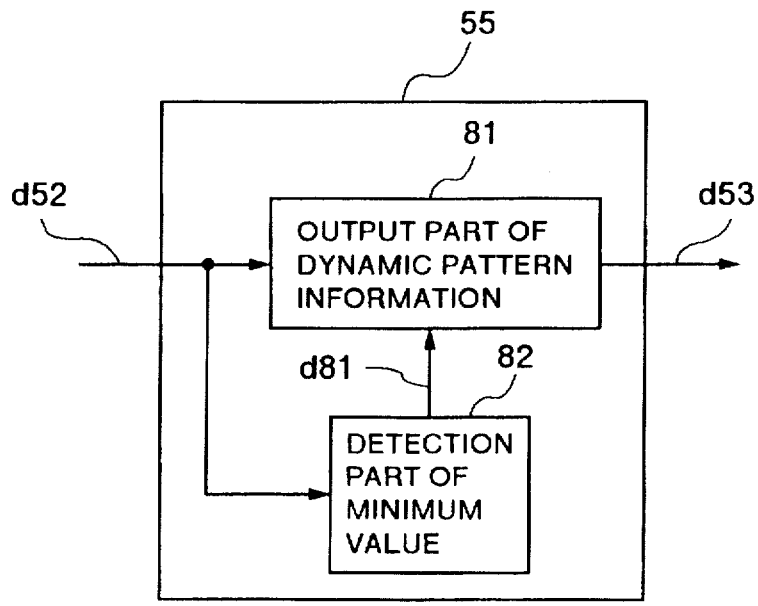
FIG. 8 is a block diagram showing the configuration of a detection part 55 of dynamic pattern.
Figure 9:
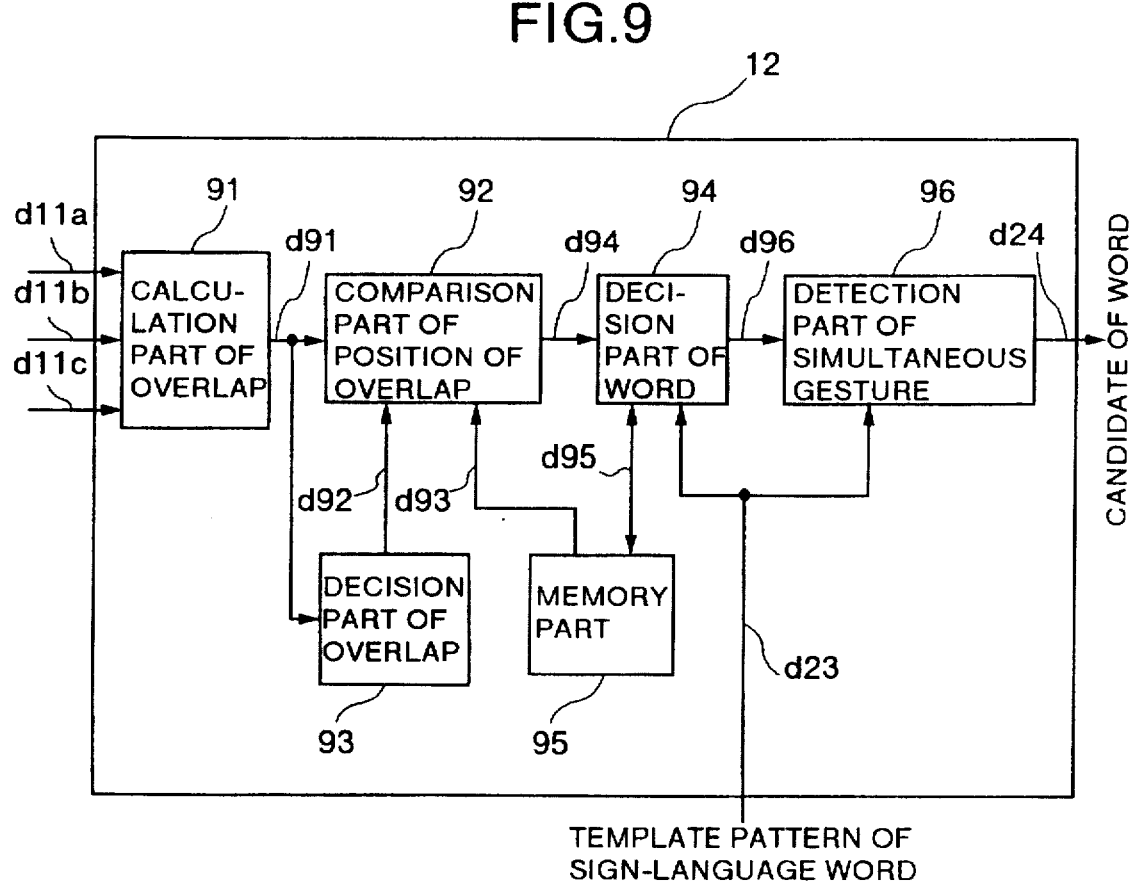
FIG. 9 is a block diagram showing the configuration of a detection part 12 of sign-language word.
Figure 13:
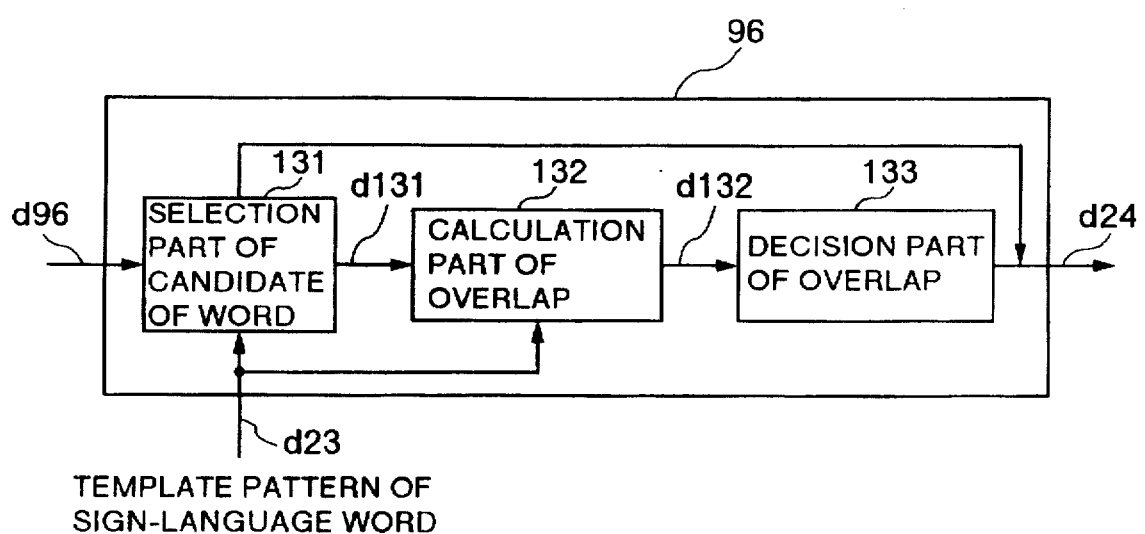
FIG. 13 is a block diagram showing the configuration of a detection part 96 of simultaneous gesture.

Next, the operation of the sign-language word recognition apparatus 2 will be explained in detail with reference to FIGS. 1, 5, 7, 8, 9 and 13. FIG. 1 is a block diagram showing the sign-language word recognition apparatus according to the present invention; FIG. 5 is a block diagram showing a matching part of pattern for matching an inputted sign-language pattern with the template patterns of sign-language word; FIG. 7 is a block diagram showing a detection part of pattern for detecting that a matched pattern is a static pattern; FIG. 8 is a block diagram showing a detection part of pattern for detecting that a matched pattern is a dynamic pattern; FIG. 9 is a block diagram showing a detection part of sign-language word for detecting a candidate of sign-language word from the pattern detection result; and FIG. 13 is a block diagram showing a detection part of simultaneous gesture for detecting a simultaneous gesture in sign-language expressions.

A matching part 11a of position pattern, a matching part 11b of direction pattern, and a matching part 11c of figure pattern respectively receive a position pattern d21a, a direction pattern d21b and a figure pattern d21c of a sign-language pattern d21 inputted from the interface 22, and match the respective received patterns of the inputted sign-language pattern with a position pattern d22a, a direction pattern d22b and a figure pattern d22c of each template pattern d22 of sign-language word stored in the dictionary 23 of template pattern of sign-language, respectively. In this event, for all morphemes constituting a word to be matched, each component pattern of the inputted sign-language pattern is matched with each component pattern of the template pattern of sign-language word. Also, the matching of the respective component patterns is carried out individually for right hand patterns and left hand patterns, respectively.

The operations of the matching parts 11a, 11b, 11c of pattern will be explained in detail with reference to FIG. 5. A matching process is executed respectively for patterns "position of hand", "direction of palm" and "figure of hand" by one and the same unit. First, each of selection parts 51 and 52 determines the kind of each of patterns contained in the template pattern d22 of sign-language word and selects a continuous DP matching part 53 or a calculation part 54 of distance between vectors, to which the inputted sign-language pattern d21 and the template pattern d22 of sign-language word are to be inputted. Specifically, when the kind of pattern indicates static, the inputted sign-language pattern d21 and the template pattern d22 of sign-language word are supplied to the calculation part 54 of distance between vectors. In the calculation part 54 of distance between vectors, a calculation is made to the distance between an n-th order vector of the inputted sign-language pattern at each time of time-series data and an n-th order vector of the template pattern of sign-language word. This calculation of the distance employs, for example, a weighted Euclid distance as follows:

$$d = \sum_{i=1}^{n} W_i(v_i - p_i)^2 \qquad (1)$$

where d: distance between the pattern vectors;
n: number of order of pattern vector;
$w_i$: weight for the i-th order;
$v_i$: i-th order data of inputted sign-language pattern;
$p_i$: i-th order data of template pattern of sign-language word.

Other than the Euclid distance, an equation commonly used in the pattern recognition such as a Mahalanobis distance, correlation between individuals, and so on may be used as the equation for the distance calculation. Alternatively, a pattern classification and recognition technique such as vector quantization may also be used. This matching is executed at each time to obtain a time-series pattern of the distance as a curve d63 of FIG. 6. When the kind of pattern indicates dynamic, the inputted sign-language pattern d21 and the template pattern d22 of sign-language word are supplied to the continuous DP matching part 53. In the continuous DP matching part 53, the continuous DP matching is executed between the inputted sign-language pattern and the template pattern of sign-language word (see "Continuous Word Recognition using Continuous DP", by Oka, the Speech Study Group of Acoustical Society of Japan, S78-20, pp. 145 to 152, 1978). The continuous DP matching is a method of continuously matching two time-series patterns with each other while permitting expansion/contraction of time, wherein an inputted sign-language pattern is matched with template patterns of sign-language word at each time, so as to detect a matching start time at which two patterns (time-series patterns of n-th order vector) match with each other most closely. Then, the matching start time and the distance between the inputted sign-language pattern and the template pattern of sign-language word at that time are outputted. As a result, the distance between the inputted sign-language pattern and the template pattern of sign-language word is obtained as time-series data as indicated by curves d61, d62 in FIG. 6.

The method of matching static and dynamic patterns with template patterns of sign-language word is not limited to the distance calculation and the DP matching method as described above, but may be any method as long as it provides information for pattern detection such as the distance between patterns, the certainty factor on the existence of a pattern, or the like. For example, the matching method may employ a neural network which receives pattern vectors at each time and learns which morphemes the inputted pattern vectors correspond to, such that the output of the neural network representative of the learning result is used for the matching.

Figure 6:
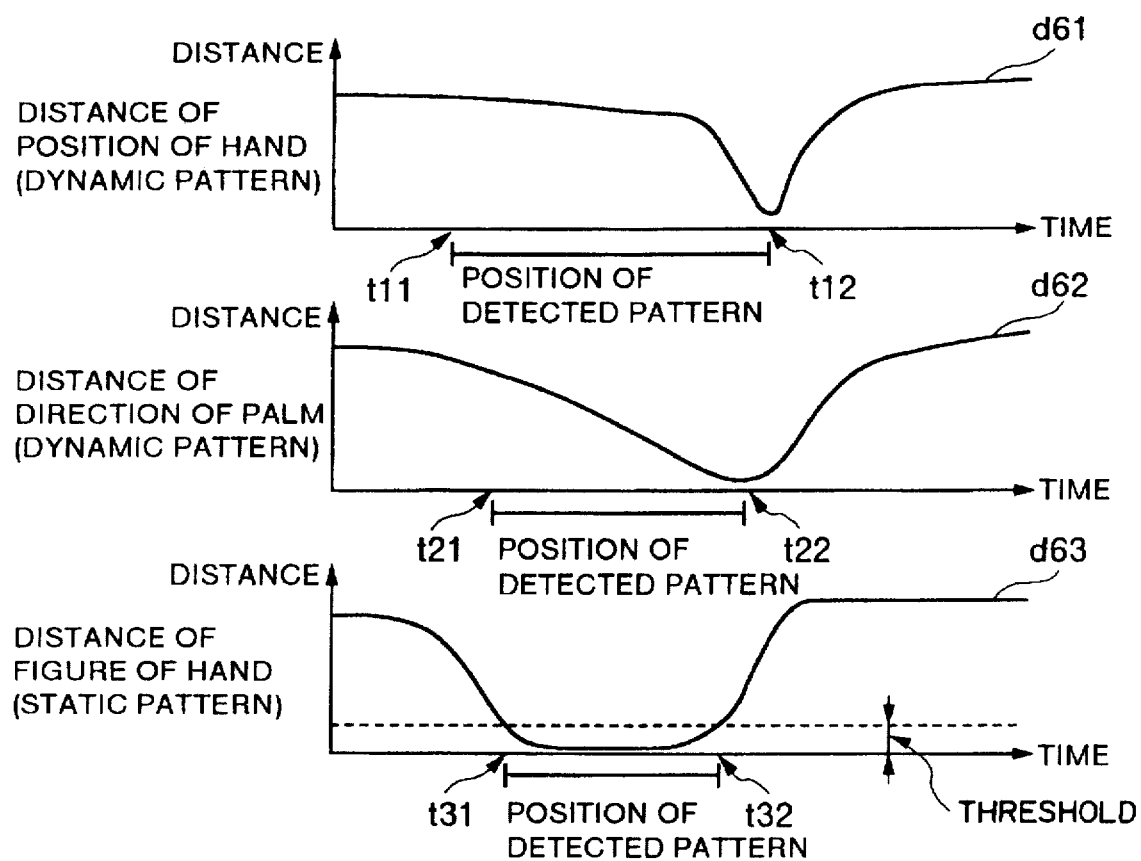
FIG. 6 shows graphs representing exemplary matching results of respective component patterns.

As a result of the matching as described above, for the matched morpheme, time-series data of the distance between the inputted sign-language pattern and the template pattern of sign-language word is outputted for each component pattern, as indicated by curves d61, d62, d63 in FIG. 6. In the example of FIG. 6, it is assumed that the component patterns "position of hand" and "direction of palm" are dynamic patterns, while "figure of hand" is a static pattern. The following explanation will be given on this assumption.

The matching result from the calculation part 54 of distance between vectors is inputted to the detection part 56 of static pattern, while the matching result from the continuous DP matching part 53 is inputted to the detection part 55 of dynamic pattern. The operation of the detection part 56 of static pattern will be explained in detail with reference to FIG. 7. First, a detection part 71 of point crossing threshold detects a time at which an inputted distance d51 changes from a value equal to or more than a threshold to a value less than the threshold and a time at which the distance d51 changes from a value less than the threshold to a value equal to or more than the threshold. A memory part 73 of changing time stores the time in response to a change signal d71, generated from the detection part 71 of point crossing threshold, indicative of a change from a value equal to or more than the threshold to a value less than the threshold. Next, an output part 72 of information of static pattern, upon receiving a detection signal d72 indicative of a change from a value less than the threshold to a value equal to or more than the threshold, calculates a time length, during which a value less than the threshold remains, from the time d73 stored in the memory part 73 of changing time, and outputs the time d73 and the calculated time length. It will be understood that the detection part 56 of static pattern detects a portion from t31 to t32 of the curve d63 in FIG. 6.

Next, the operation of the detection part 55 of dynamic pattern will be explained with reference to FIG. 8. A detection part 82 of minimum value detects a time at which the distance presents a minimum value from an inputted time-series pattern d52 of the distance. An output part 81 of information of dynamic pattern, upon receiving a minimum value detection signal d81, calculates a time length of the pattern from a time at which the distance reaches the minimum value and a matching start time which gives the minimum distance. Then, these time values and time length are outputted. It will be understood that this detection part 55 of dynamic pattern detects the time points t11, t12, t21, t22 and the time lengths between t11 and t12 and between t21 and t22.

The pattern matching parts 53, 54 and the pattern detection parts 55, 56 provide the result of matching an inputted sign-language pattern with morpheme patterns registered in the dictionary 23 of template pattern of sign-language for each of the component patterns ("position of hand", "direction of palm", and "figure of hand"). If the detected positions (information on pattern detected time and time length) of the respective component patterns overlap with each other, it can be identified that the input pattern corresponds to a matched morpheme. Further, if the detected positions of a sequence of detected morphemes fall under a predetermined tolerable range, the inputted pattern can be identified to be the sign-language word which has been matched therewith. This process is executed in the detection part 12 of sign-language word. The operation of the detection part 12 of sign-language word will be explained in detail with reference to FIG. 9.

When the pattern detected positions d11a, d11b, d11c of the component patterns are inputted to the detection part 12 of sign-language, a calculation part 91 of overlap first calculates the rate of overlap and the overlapping position for the detected positions of the three component patterns.

The overlap of detected positions of the component patterns is calculated for all morphemes constituting a word to be detected. The rate of overlap is expressed by using a relative criterion based on the ratio of the length of the overlapping portion of the three component patterns to the overall length of the component patterns. For this purpose, the following equation may be applied by way of example:

$$o = \frac{\min(t12, t22, t32) - \max(t11, t21, t31)}{\max(t12, t22, t32) - \min(t11, t21, t31)} \quad (2)$$

where o: rate of overlap of three kinds of component patterns;

t11, t12: starting point and end point of pattern "position of hand";

t21, t22: starting point and end point of pattern "direction of palm";

t31, t32: starting point and end point of pattern "figure of hand".

Figure 10:
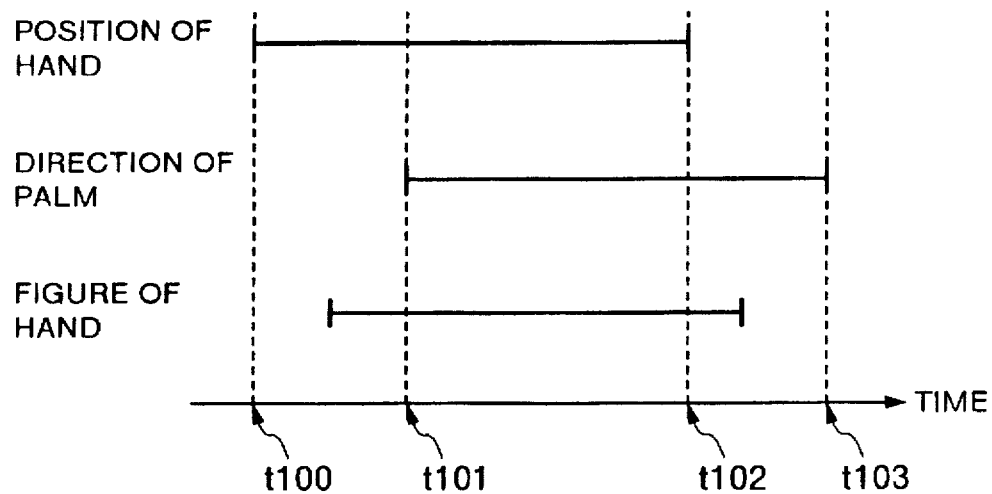
FIG. 10 schematically shows how component patterns overlap with each other.
Figures 11A, 11B:
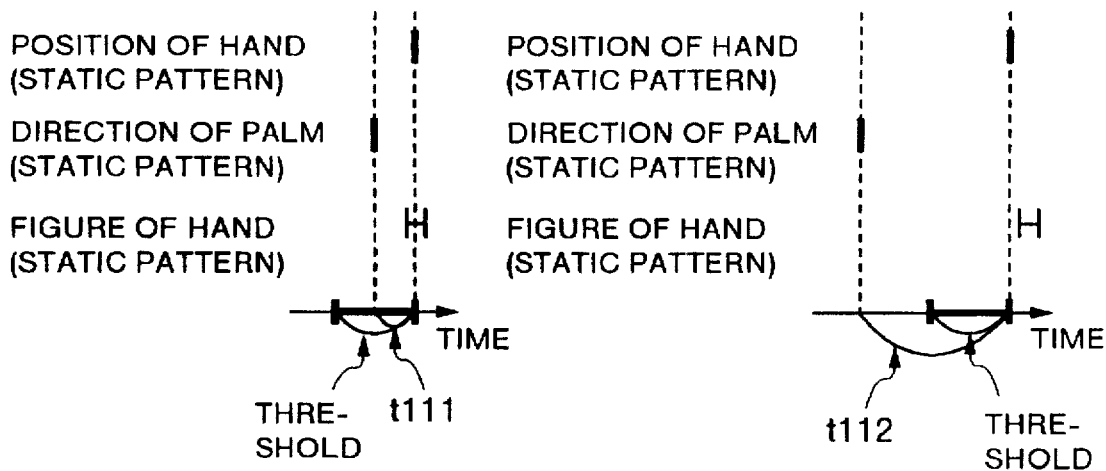

With the three component patterns assumed in the relation as shown in FIG. 10, the rate of overlap is expressed by the ratio of the length from t101 to t102 to the length from t100 to t103. As another equation for calculating the rate of overlap, it is also possible to use an average of ratios of an overlapping portion of the three component patterns to the lengths of the respective component patterns. Alternatively, if the rate of overlap is likewise calculated not only for the case where all of the three components overlap with each other but also for the case where only two of them overlap, the recognition accuracy can be improved for a word which may often include a component pattern that fluctuates too largely to be detected. In this case, additional information should be added to indicate that only two component patterns are overlapping, or the equation for calculating the rate of overlap should include a penalty for taking account of the fact that overlapping component patterns are only two. When a morpheme consists of the three component patterns which are all static, the respective component patterns may occur at different timings, whereby no overlap is possibly detected in the three component patterns. It is therefore assumed only for such a case that the component patterns in a certain time range are regarded as being overlapping. More specifically, taking an example of component patterns placed in a relation illustrated in FIG. 11A, since a gap t111 between the "position of hand" pattern and the "direction of palm" pattern is smaller than a preset threshold, these patterns are regarded to be overlapping. Conversely, in an example shown in FIG. 11B, since a gap t112 between the "position of hand" pattern and the "direction of palm" pattern is larger than the threshold, no overlap is determined to exist in these component patterns. When an overlap is recognized in this manner, the rate of overlap is always set to 1.0. Alternatively, a different rate of overlap may be separately defined corresponding to a distance by which the two component pattern, regarded to be overlapping, are spaced, and used in place of the ordinary rate of overlap.

The rate of overlap d91 of the component patterns calculated in the calculation part 91 of overlap is inputted to a decision part 93 of overlap, wherein if the rate of overlap is more than a threshold, it is determined that a matched morpheme has been detected from the inputted sign-language pattern, thus outputting a detection signal d92 from the decision part 93 to drive a comparison part 92 of position of overlap. The comparison part 92 of position of overlap determines whether or not a positional relation between one of morphemes constituting a word to be matched and a morpheme detected previously is within a tolerance value. The position of the previously detected morpheme has been stored in a memory part 95. This is a process required to a word to be detected which is constituted of a plurality of morphemes. With the first morpheme constituting a word, that is, if no information on morphemes constituting a word to be detected is stored in the memory part 95, the comparison part 92 of position of overlap unconditionally outputs current morpheme information. A decision part 94 of word compares information d95 in the memory part 95 and information d23 in the dictionary 23 of template pattern of sign-language with information d94 on the detected morphemes, to determine whether a word has been detected. If it is determined that a word has been detected, the word and a detected position d96 are outputted. If a detected morpheme is not the last one constituting the word, information on that morpheme is stored in the memory part 95. Since all morphemes constituting a word are in parallel detected in the detection of a word, a plurality of candidates of the word may be generated. For this reason, the memory part 95 is preferably structured to permit a plurality of candidates of a word to be stored therein.

Figure 12:
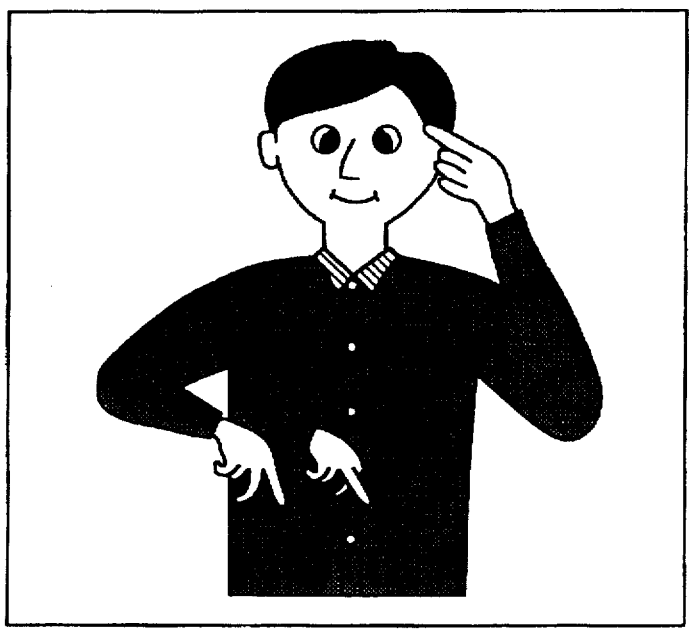
FIG. 12 shows an example of a sign-language word expressed by a simultaneous gesture.

Finally, a detection part 96 of simultaneous gesture examines whether a simultaneous gesture exists. The simultaneous gesture is an expression method peculiar to the sign-language and is such one that simultaneously expresses two sign-language words representing two actions. For example, a sign-language representing "to think while walking" is performed as shown in FIG. 12. The operation of the detection part 96 will be explained in detail with reference to FIG. 13. For the purpose of recognizing a simultaneous gesture, patterns expressed by one hand have previously been stored in the dictionary 23 of template pattern of sign-language for sign-language words which may possibly be combined to represent a simultaneous gesture. First, a selection part 131 of word selects words which may be used in a simultaneous gesture from candidates of words d96 sent from the decision part 94 of word by referring to the dictionary 23 of template pattern of sign-language. For a sign-language pattern which may express a simultaneous gesture, candidates of word therefor are delivered to a calculation part 132 of overlap. Also, sign-language words normally expressed by one hand, which may be used for expressing a simultaneous gesture, are thought to be used for a single expression as well as a simultaneous gesture. For this reason, these sign-language words are outputted as they are as candidates of word d24 as well as delivered to the calculation part 132 of overlap. Sign-language words which will not be used for a simultaneous gesture are outputted as they are as candidates of word d24. A sign-language word d131 which may be used for a simultaneous gesture is next supplied to the calculation part 132 of overlap for calculating the rate of overlap. In this case, words subjected to the calculation of the rate of overlap are limited to those including component patterns which do not overlap with each other. For example, if one sign-language word is expressed by the left hand, the other must be expressed by the right hand. This determination is made by referring to the contents d23 in the dictionary 23 of template pattern of sign-language.

Calculation of the rate of overlap between words may be implemented by a similar method to the above described calculation of the rate of overlap for the component patterns. A calculated rate of overlap d132 is used in a decision part 133 to determine whether or not a simultaneous gesture is recognized. This determination may also be made whether or not the rate of overlap is equal to or more than a threshold, similarly to the aforementioned determination performed by the decision part 94 of word. For words which are determined to represent a simultaneous gesture in the decision part 133 of overlap, a combination of two words are outputted as a candidate of word d24.

Figure 15:
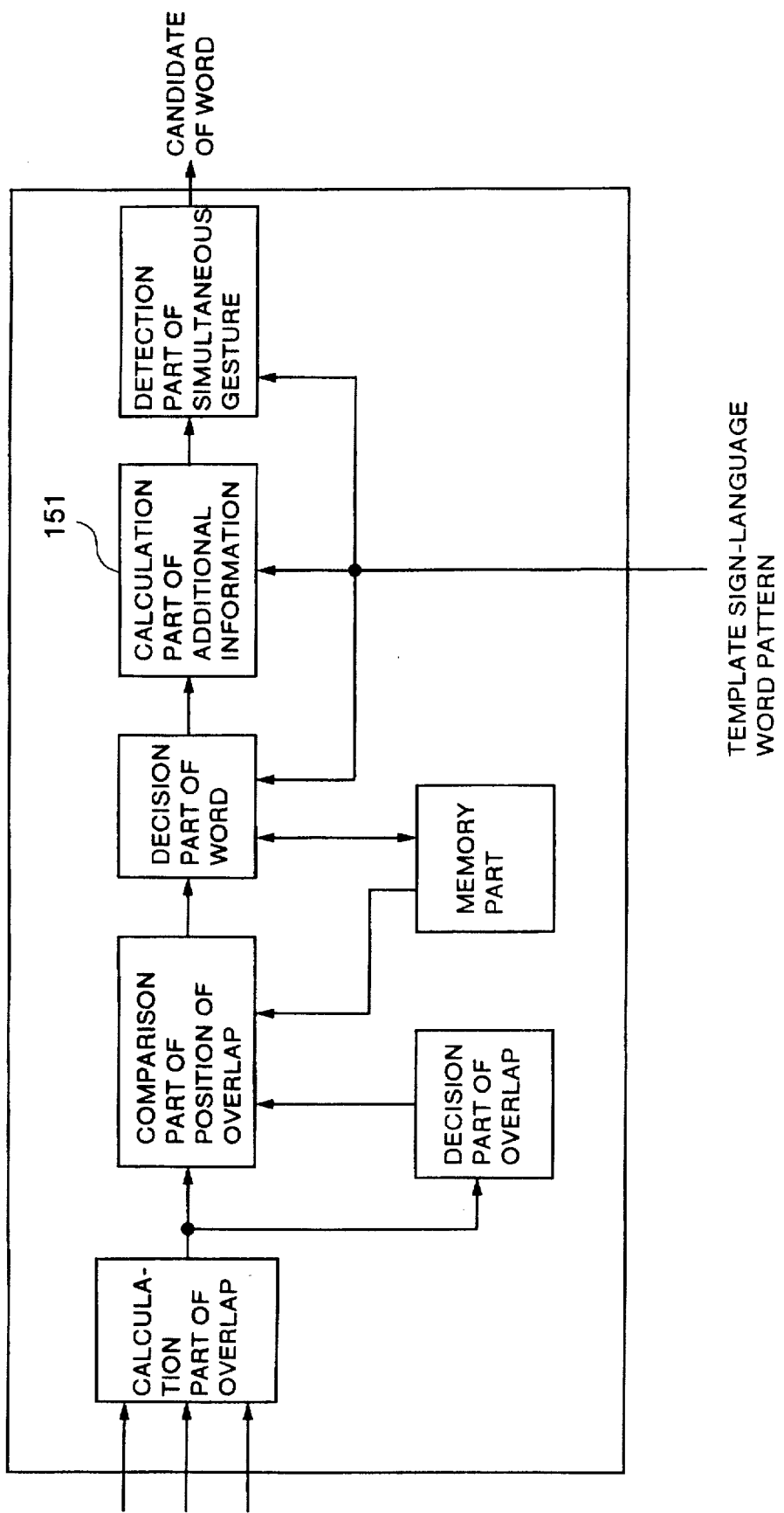
FIG. 15 is a block diagram showing the configuration of a detection part 12 of sign-language word which is additionally provided with a means for extracting additional information from a context dependent pattern.

In the above described embodiment, all parameters associated with the component patterns stored in the dictionary 23 of template pattern of sign-language are used to recognize sign-language words during the recognition process. The sign-language, however, may include parameters which are expressed by similar motion, figure and direction of hand and always indicate the same patterns, whichever context they are used in, and other parameters whose patterns change depending on a context to be expressed. In the latter case, even the meaning of certain sign-language patterns may change. For this reason, pattern data used in the dictionary 23 of template pattern of sign-language may be classified into a situation dependent parameter group and a situation independent parameter group, such that situation independent parameters are used in the recognition to detect words, while situation dependent parameters, which are thought to be necessary in subsequent processes, may be extracted after the detection of sign-language words. In this case, the dictionary 23 of template pattern of sign-language may take a format as shown in FIG. 14. Specifically, information on a pattern associated with each hand consists of kind of pattern 141, pattern data 142 and additional information 143. The kind of pattern 141 and pattern data 142 are similar to those in FIG. 3. The additional information 143 describes which information is extracted from an associated pattern when a component pattern thereof is context dependent. Also, the detection part 15 of sign-language word may be modified as shown in FIG. 15 in order to process the additional information. A calculation part 151 of additional information calculates necessary information from a context dependent component pattern in accordance with the contents of the additional information registered in the dictionary 23 of template pattern of sign-language.

(Embodiment 2)

An embodiment which realizes the sign-language recognition apparatus 24 of the first embodiment by software will be described below with reference to FIGS. 16–20.

Figure 16:
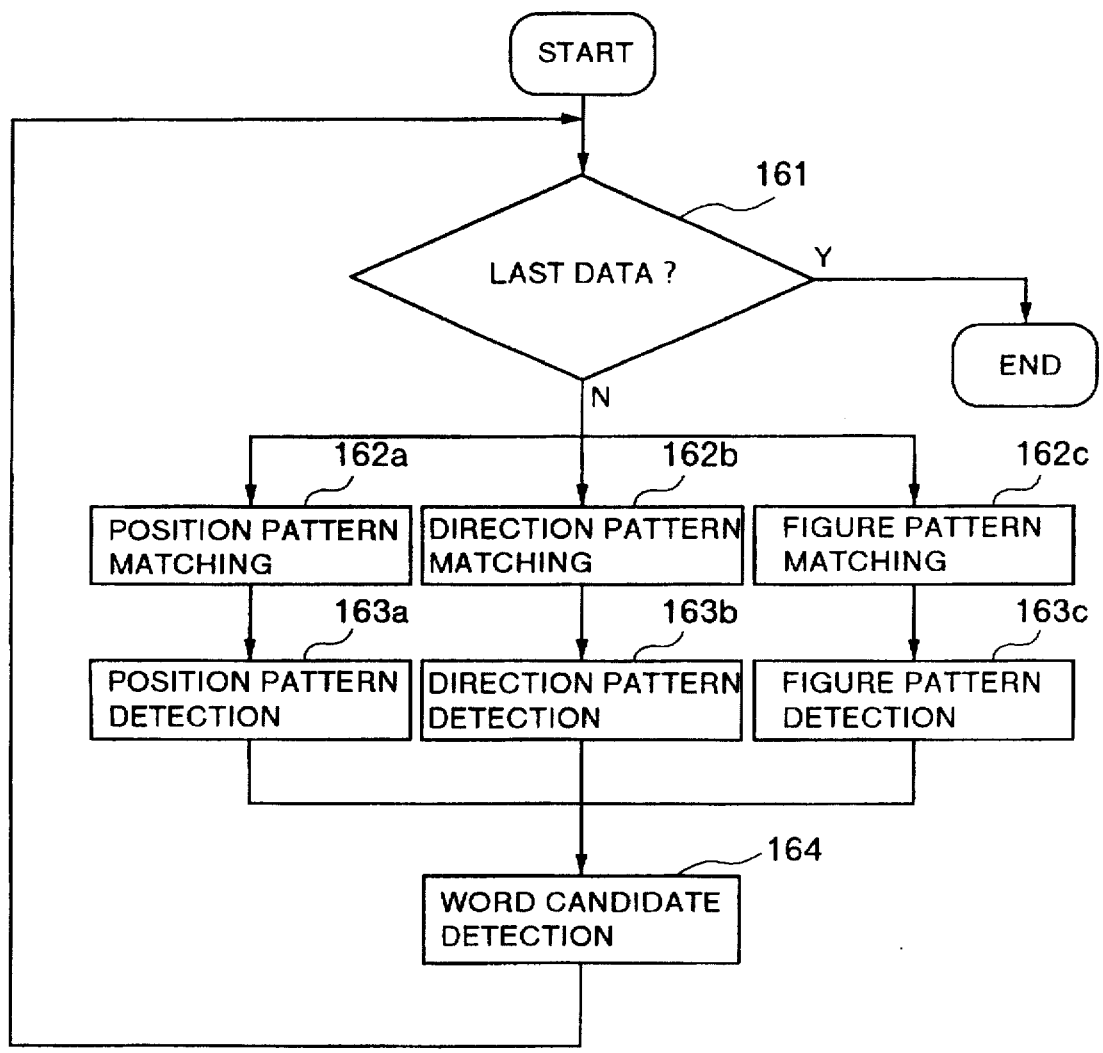
FIG. 16 is a flow chart showing a procedure of a process of sign-language word.
Figure 17:
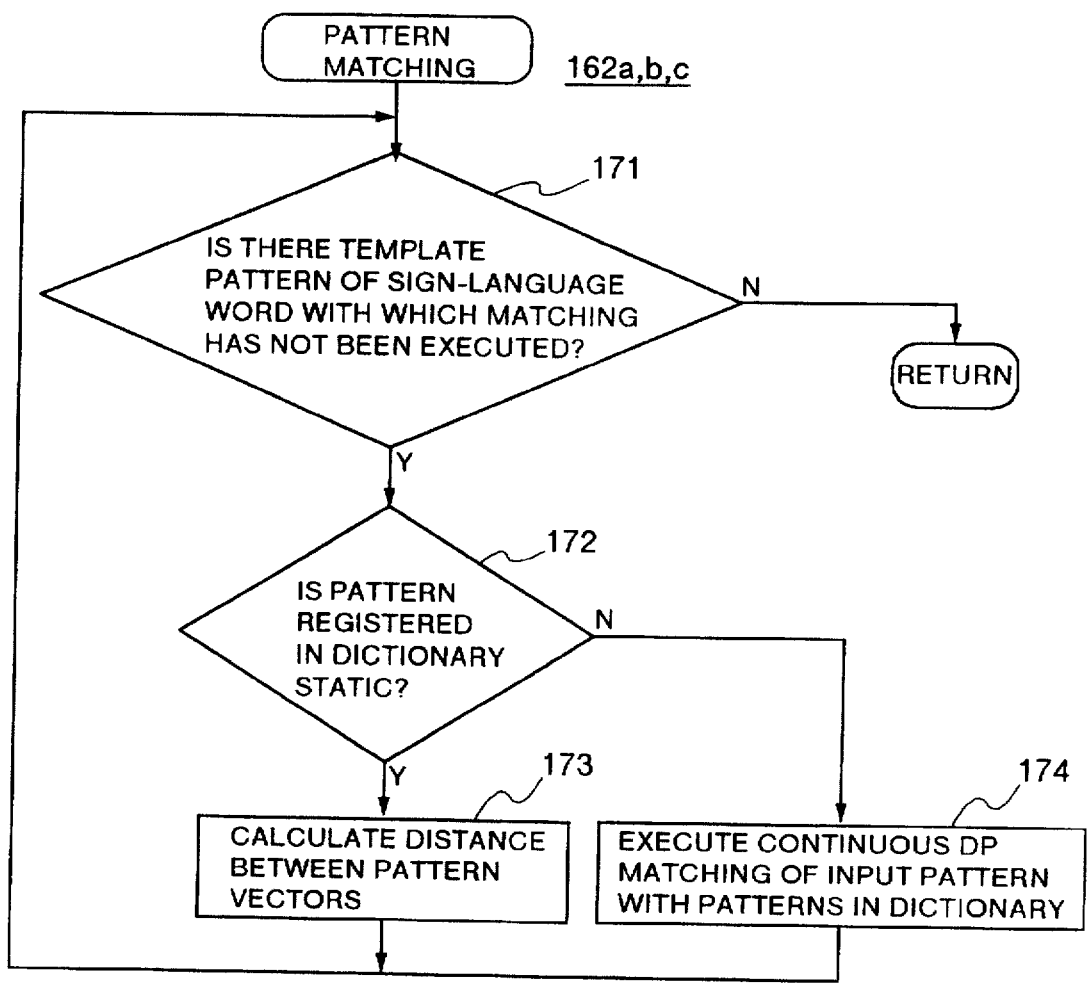
FIG. 17 is a flow chart showing a procedure of processes 162a, 162b, 162c of pattern matching.
Figure 18:
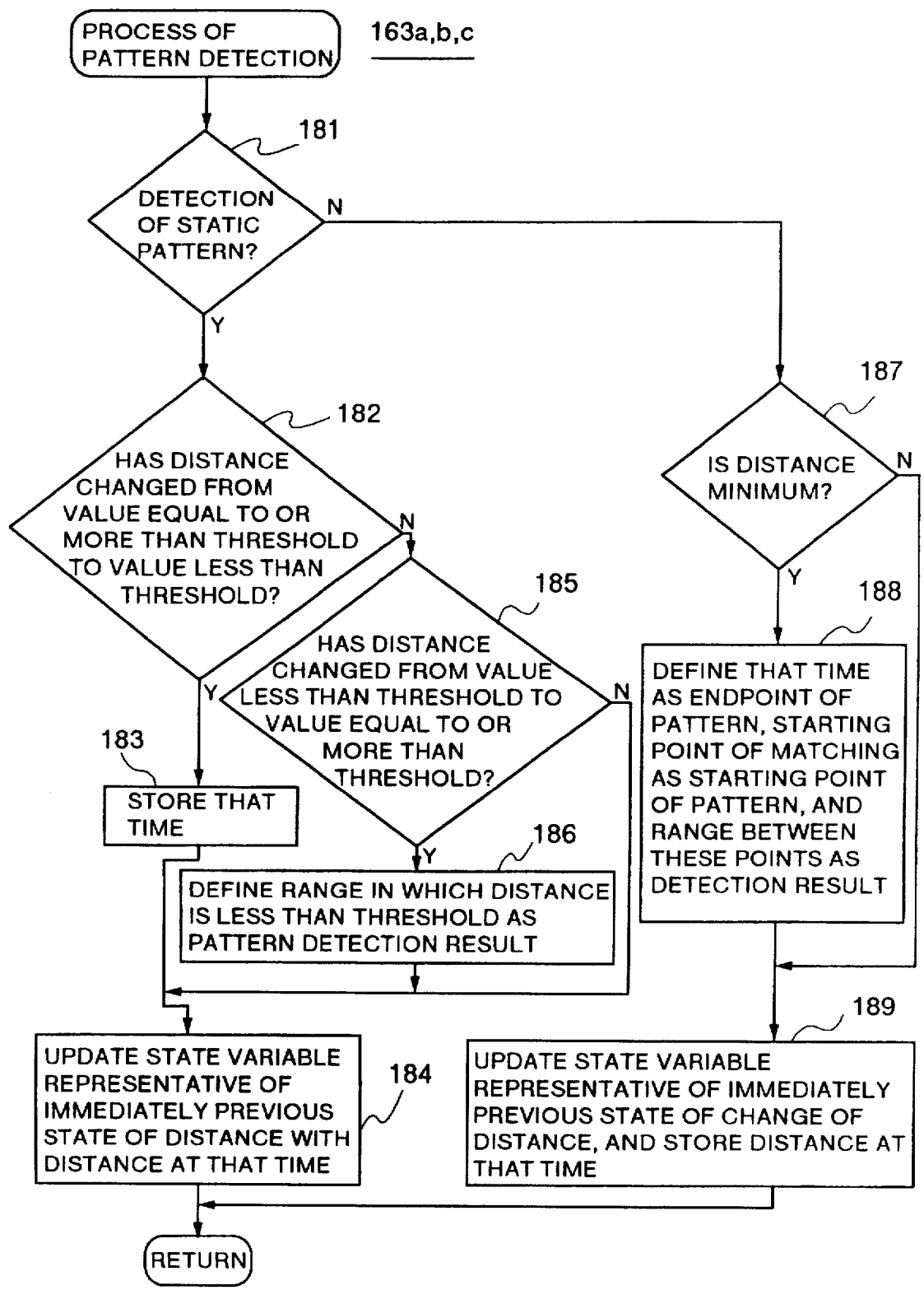
FIG. 18 is a flow chart showing a procedure of processes 163a, 163b, 163c of pattern detection.
Figure 19:
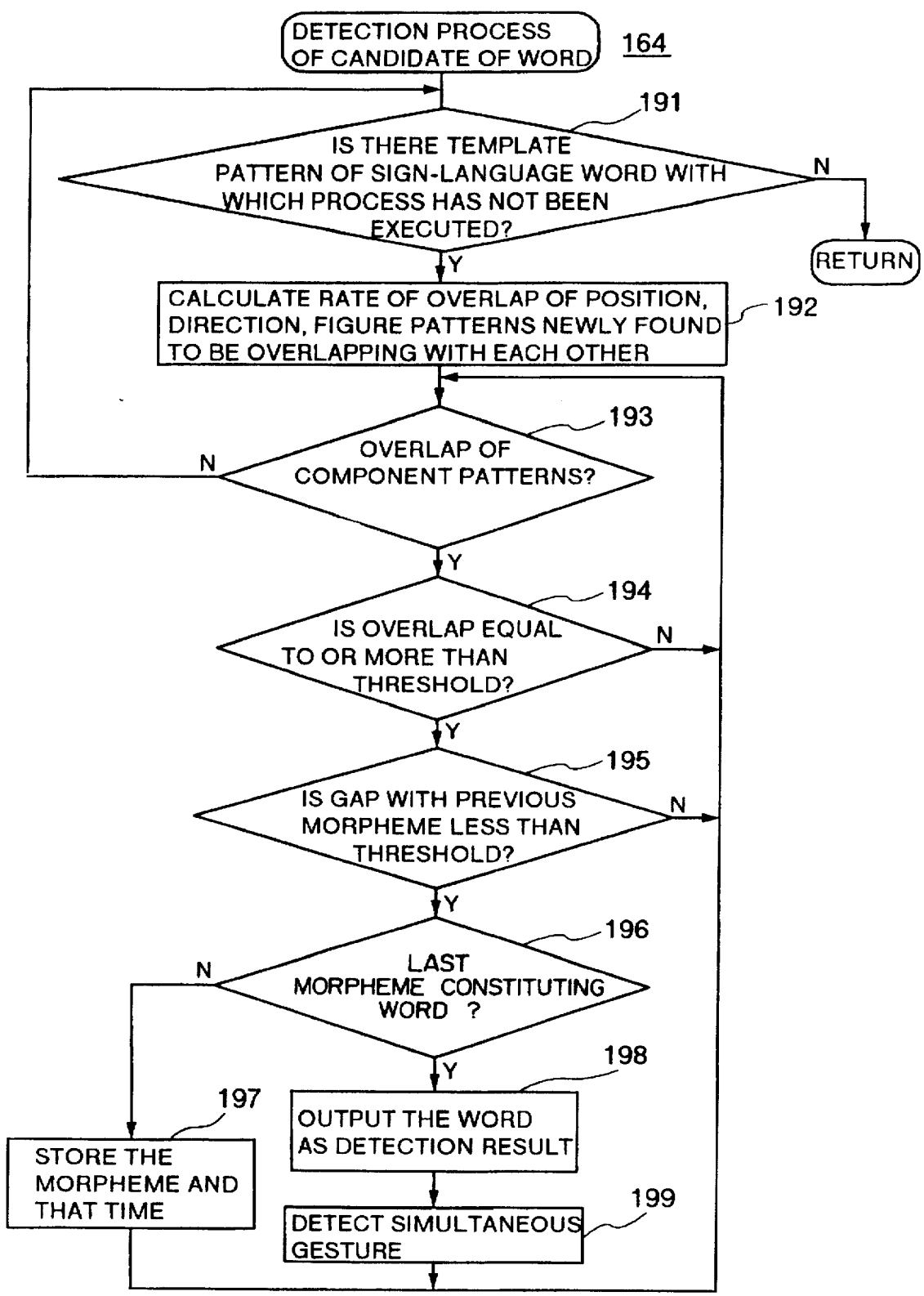
FIG. 19 is a flow chart showing a procedure of a process 64 of detection of candidate of word.
Figure 20:
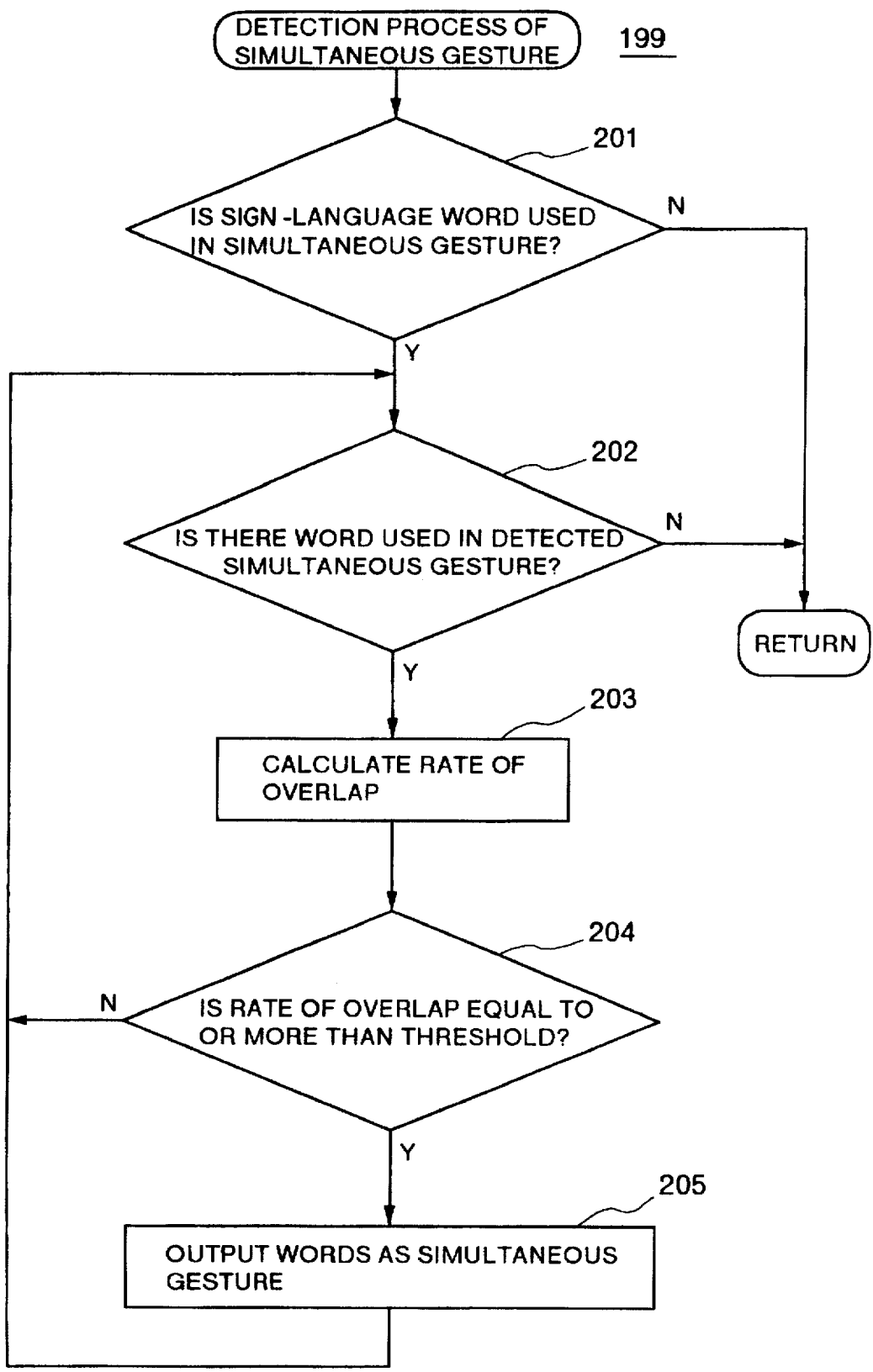
FIG. 20 is a flow chart showing a procedure of a process 199 of detection of simultaneous gesture.

FIG. 16 is a flow chart showing an entire flow of a sign-language word recognition process; FIG. 17 is a flow chart showing a procedure of matching an input sign-language pattern with template patterns of sign-language word; FIG. 18 is a flow chart showing a procedure of detecting three component patterns, i.e., "position of hand", "direction of palm", and "figure of hand" from a matching result; FIG. 19 is a flow chart showing a procedure of a word detection process for detecting candidates of a sign-language word from the matching result; and FIG. 20 is a flow chart showing a procedure of a sign-language detection process for recognizing a simultaneous gesture from detected words.

Referring first to FIG. 16, at step 161, a data for one unit time portion of a sign-language pattern inputted from the interface 22 is received, and an examination is made as to whether the currently inputted data is the last one. If the current data is the last, the sign-language word recognition process is terminated. If further data remain, the procedure advances to pattern matching processes for the respective component patterns at steps 162a, 162b, 162c, wherein the inputted sign-language pattern is matched with template patterns of sign-language word stored in the dictionary 23 of template pattern of sign-language. The pattern matching is executed for each of the component patterns "position of hand", "direction of palm" and "figure of hand".

Now, the procedure of the pattern matching processes 162a, 162b, 162c will be explained in detail with reference to FIG. 17. While the pattern matching processes are executed for the patterns "position of hand", "direction of palm" and "figure of hand", respectively, they can be carried out by completely the same process procedure. In each of the pattern matching processes 162a, 162b, 162c, data on one unit time portion of the inputted sign-language pattern is matched with all sign-language words registered in the dictionary 23 of template pattern of sign-language. For this purpose, it is first examined at step 171 whether or not there remain template patterns of sign-language word in the dictionary 23 of template pattern of sign-language which have not been matched with the inputted component pattern. If there remains no template pattern of sign-language word in the dictionary 23 to be matched with the inputted component pattern, the pattern matching process is terminated. If one or more template patterns of sign-language word to be matched remain in the dictionary 23, the procedure advances to step 172, where an examination is made as to whether the kind of a template pattern of sign-language word to be matched is static or dynamic by referring to the dictionary 23 of template pattern of sign-language as to the kind of the template pattern of sign-language word to be matched. When the template pattern to be matched is static, the procedure advances to step 173, where the inputted data is matched with the template pattern of sign-language word as being a static pattern. On the contrary, when the template pattern to be matched is dynamic, the procedure advances to step 174, where the inputted data pattern is matched with the template pattern as being part of a dynamic pattern. For the matching methods applied to the static pattern and the dynamic pattern, this embodiment employs the same methods as those which are used in the calculation part 54 of distance between vectors and the continuous DP matching part 53 in FIG. 5.

After the inputted sign-language pattern has been matched with template patterns of sign-language word, the respective component patterns are detected at a position pattern detection step 163a, a direction pattern detection step 163b, and a figure pattern detection step 163c, respectively. While these processes are executed respectively for the patterns "position of hand", "direction of palm", and "figure of hand", they can be implemented by completely the same process procedure. The pattern detection process will now be explained in detail with reference to FIG. 18. In FIG. 18, it is first determined at step 181 whether a component pattern is static or dynamic by referring to the kind of pattern in a template pattern of sign-language word to be detected. For detecting a static pattern, it is determined at step 182 whether the distance has changed from a value equal to or more than a threshold to a value less than the threshold. If the distance has changed from a value equal to or more than the threshold to a value less than the threshold, the changing time is stored at step 183. Then, a state variable indicating whether the distance at that time is equal to or more than the threshold or less than the threshold is updated at step 184. This state variable is utilized at step 182 and in a determination process at step 185, later described. In the pattern detection processes 163a, 163b, 163c, the state of the distance one unit time before is required. However, since these processes should be executed for each inputted matching result for one unit time portion of the component patterns, this state variable need be set for these processes to be executed next time. After the state variable has been updated, the procedure exits the pattern detection process steps 163a, 163b, 163c. If the determination at step 182 indicates that the distance has not changed from a value equal to or more than the threshold to a value less than the threshold, it is determined at step 185 whether the distance has changed from a value less than the threshold to a value equal to or more than the threshold. If the time at which the change has occurred is detected, the procedure advances to step 186, where the stored time at which the distance has changed from the value equal to or more than the threshold to the value less than the threshold and the current time are defined to be pattern detected positions. Thereafter, the procedure advances to step 184, where the state variable is updated. If a change of the distance from a value less than the threshold to a value equal to or more than the threshold is not detected at step 185, the procedure advances to step 184.

Turning back to step 181, for detecting a dynamic pattern, the procedure advances to step 187, where a minimum value of the distance is detected. When the minimum value is detected, the time at which the minimum value is detected is defined to be an end point of the pattern, a starting point of the matching in this case is defined to be a starting point of the pattern, and the range between the starting point and the end point is defined to be the detection result. Subsequently, at step 189, a state variable, indicating whether the changing direction of the distance immediately before the minimum value detected time is in the decreasing direction or in the increasing direction, is updated and the distance at the minimum value detected time is stored. These state variable and distance are utilized for detecting the minimum value at step 187. If the minimum value is not detected at step 187, the procedure advances to step 189.

After the respective component patterns of morphemes constituting each word have been detected, the procedure advances to a word candidate detection process at step 164 (FIG. 16), where a candidate of sign-language word is detected from the matching results. The procedure of the word candidate detection process 164 will be explained in detail with reference to FIG. 19. The word candidate detection process 164 detects a candidate of word from time-series data of the distance at each time which is the matching result of the inputted sign-language pattern with each template pattern of sign-language word. For this operation, an examination is first made at step 191 of FIG. 19 whether or not template patterns of sign-language word still remain so that the input sign-language pattern is to be matched with them for the word detection process. If no template pattern of sign-language word remains for the word detection process, this procedure is terminated. On the contrary, if one or more template patterns of sign-language word remain, the procedure advances to step 192, where, new overlaps between "position of hand", "direction of palm" and "figure of hand" are searched for newly detected components and previously detected components, and the rate of overlaps are calculated therefor. Such overlapping component patterns are searched in all combinations of patterns which represent morphemes constituting a word. The rate of overlap may be calculated by a method similar to that used in the calculation part 91 of overlap in FIG. 9.

After new overlapping component patterns are searched at step 192, it is examined at step 193 whether overlapping component patterns to be evaluated still remain or not. If such overlapping component patterns still remain, the following processes are executed for the respective overlapping component pattern sets. First at step 194, the rate of overlap is examined whether it is equal to or more than a threshold. If so, it is next determined at step 195 whether a gap between a newly detected morpheme and a previously detected morpheme is equal to or more than a threshold. This process is required when a word to be detected is constituted of a plurality of morphemes. If a morpheme is the first one constituting a word, the procedure unconditionally advances to step 196. If the gap is less than the threshold, it is determined at step 196 whether or not the morpheme is the last one to be detected for recognizing the word. If it is the last one, the word and a detected position is outputted as the recognition result at step 198. Further, it is examined at step 199 whether or not a simultaneous gesture is concerned. The process of step 199 will be explained in detail with reference to FIG. 20. First at step 201, it is examined whether a detected word can be used in a simultaneous gesture. If it is a word used in a simultaneous gesture, already detected words are searched for detecting a word which can be used in a simultaneous gesture at step 202. If such a word is detected, the rate of overlap of the detected word with the newly detected word at step 202 is calculated at step 203. Then, an examination is made at step 204 whether or not the calculated rate of overlap is equal to or more than a threshold. If so, these two words are outputted as a combined word representing a simultaneous gesture. If the rate of overlap is less than the threshold, the procedure returns to step 202. At step 202, if no word which can be used in a simultaneous gesture is found from the previously detected words, the process is terminated. Also, if a word is determined to be one which cannot be used in a simultaneous gesture at step 201, the procedure is terminated.

Turning back to FIG. 19, if the determination at step 196 shows that a morpheme to be detected for recognizing a word is not the last one, the morpheme itself, a detected time thereof, and a sign-language word to be detected are stored at step 197, followed by the procedure returning to step 193. If the determination at step 195 shows that the gap is equal to or more than the threshold, and if the determination at step 194 shows that the rate of overlap is less than the threshold, the procedure returns to step 193. At step 193, if no overlapping component patterns to be evaluated remain, the procedure returns to step 191, where the above processes are repeated for a next template pattern of sign-language word. Since all morphemes constituting a word are in parallel detected in the word candidate detection process 164, a plurality of candidates of word may be stored at step 197. For this reason, the system should be configured so as to be able to store plural sets of information on a detected morpheme and a next morpheme.

(Embodiment 3)

Next, an embodiment of a continuous sign-language recognition apparatus according to the present invention, which has a dictionary 214 of sign-language word and a dictionary 212 of morpheme pattern separated from each other so as to store sign-language patterns in the unit of morpheme, will be described with reference to FIGS. 21–24.

Figure 21:
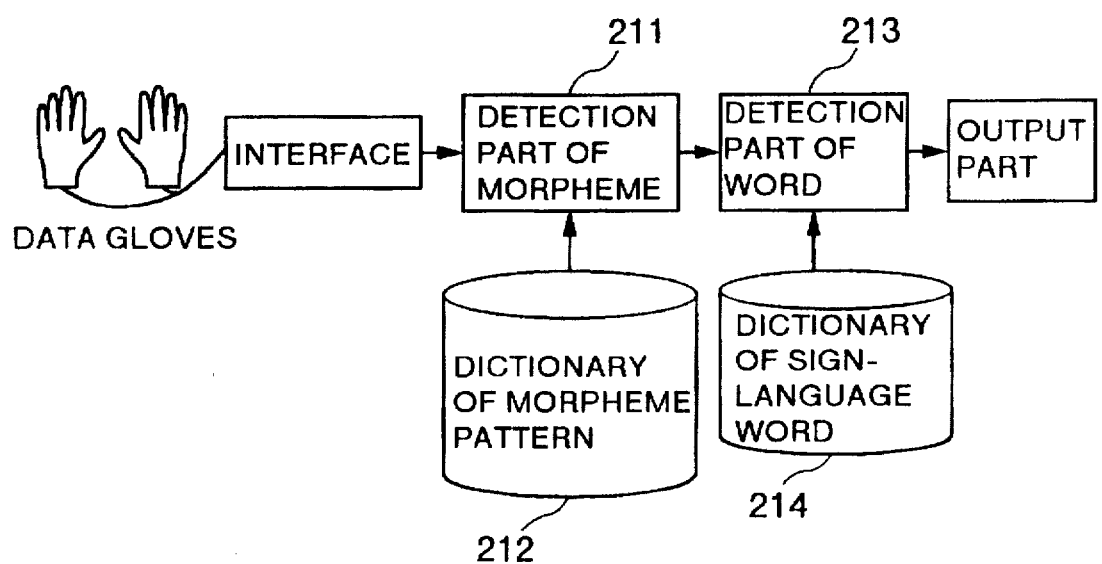
FIG. 21 is a block diagram showing a system for realizing the continuous sign-language recognition when a dictionary of morpheme and a dictionary of sign-language words are separately provided.

FIG. 21 is a block diagram showing the whole configuration of a system which uses separated dictionary of sign-language word and dictionary of morpheme pattern. First in a detection part 211 of morpheme, recognition of morpheme is executed for all morpheme patterns described in the dictionary 212 of morpheme pattern. Next, in a detection part 213 of sign-language word, a sign-language word is recognized from morphemes constituting each of words which are described in the dictionary 214 of sign-language word. FIGS. 22A and 22B show formats of the dictionary 214 of sign-language word and the dictionary 212 of morpheme pattern, respectively. As shown in FIG. 22A, names of morphemes constituting respective sign-language words only are described in the dictionary 214 of sign-language word, while actual sign-language patterns are stored in the dictionary 212 of morpheme pattern shown in FIG. 22B.

Figure 23:
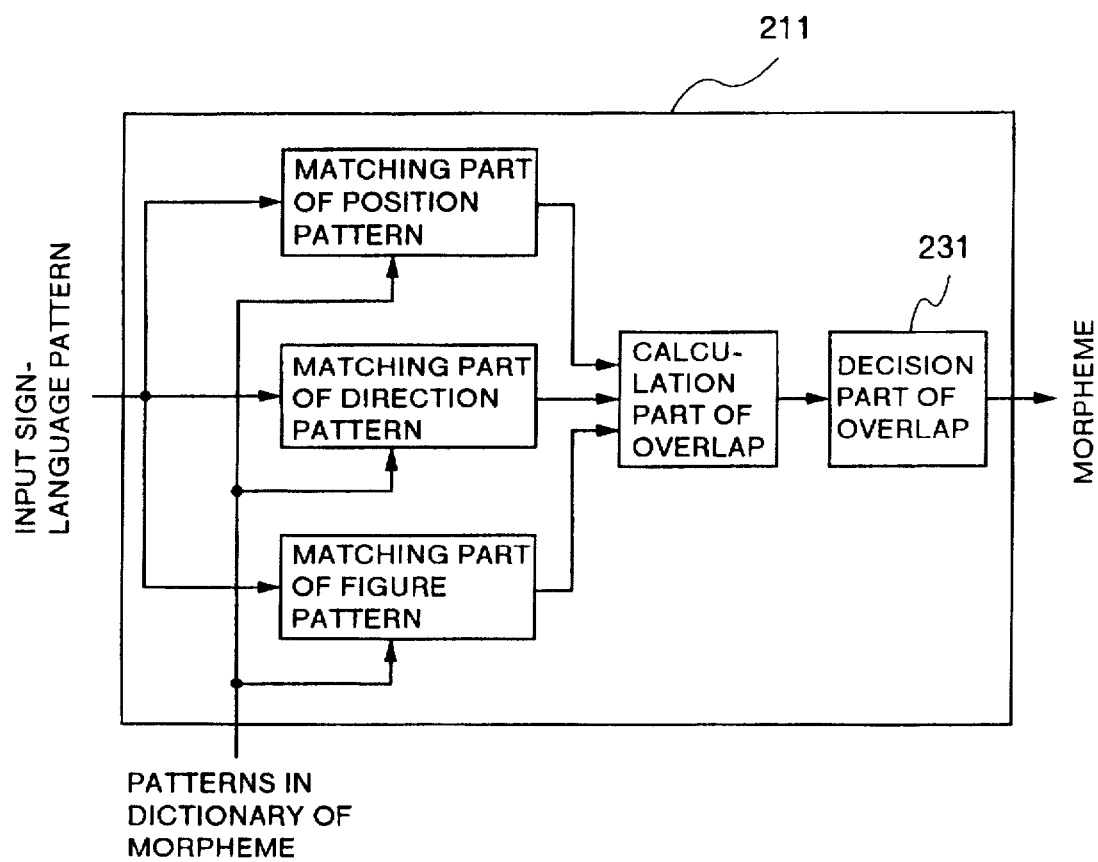
FIG. 23 is a block diagram showing the configuration of a detection part 211 of morpheme.

Next, FIG. 23 shows a block diagram of the detection part 211 of morpheme which has a combined configuration of the matching part of pattern in FIG. 5 and part of the detection part of sign-language word in FIG. 9. The operations of the respective parts and a flow of data are similar to those shown in FIGS. 5 and 9. It should be noted, however, that the operation of a decision part 231 of overlap slightly differs from its correspondent in the aforementioned embodiment. Specifically, if the rate of overlap calculated in a calculation part 231 of overlap is equal to or more than a threshold, a morpheme is determined to be detected, and the detected morpheme is outputted.

Figure 24:
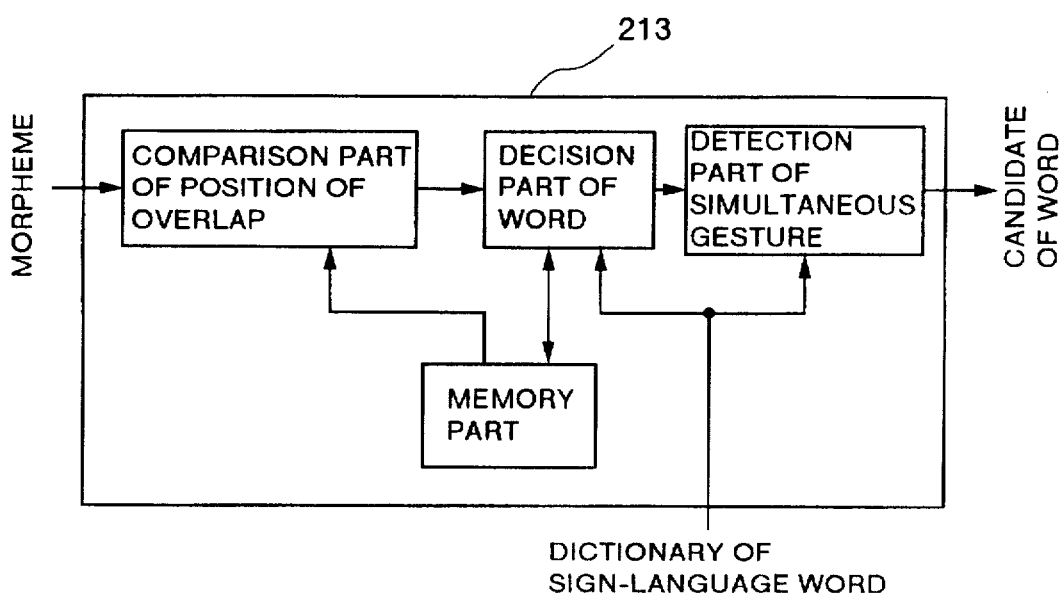
FIG. 24 is a block diagram showing the configuration of a detection part 213 of word.

FIG. 24 shows a block diagram of the detection part 213 of sign-language word which comprises several constituent parts extracted from the detection part of sign-language word of FIG. 9. The operations of the respective constituents are completely the same as those in FIG. 9.

By separating the dictionary 212 of morpheme pattern and the dictionary 214 of sign-language word in the forgoing manner, pattern data common to a plurality of sign-language words may be stored only once, so that the storage capacity required to the dictionaries can be reduced. Also, by separately executing the detection of morpheme and the detection of sign-language word, the recognition of a morpheme common to a plurality of sign-language words may be executed only once, which results in a faster recognition process.

(Embodiment 4)

Next, an embodiment of the present invention will be described with reference to FIGS. 25-30 for the case where the invention is applied to an input apparatus for inputting a command to a computer in a form of a gesture which has been preset in correspondence to the command.

Figure 25:
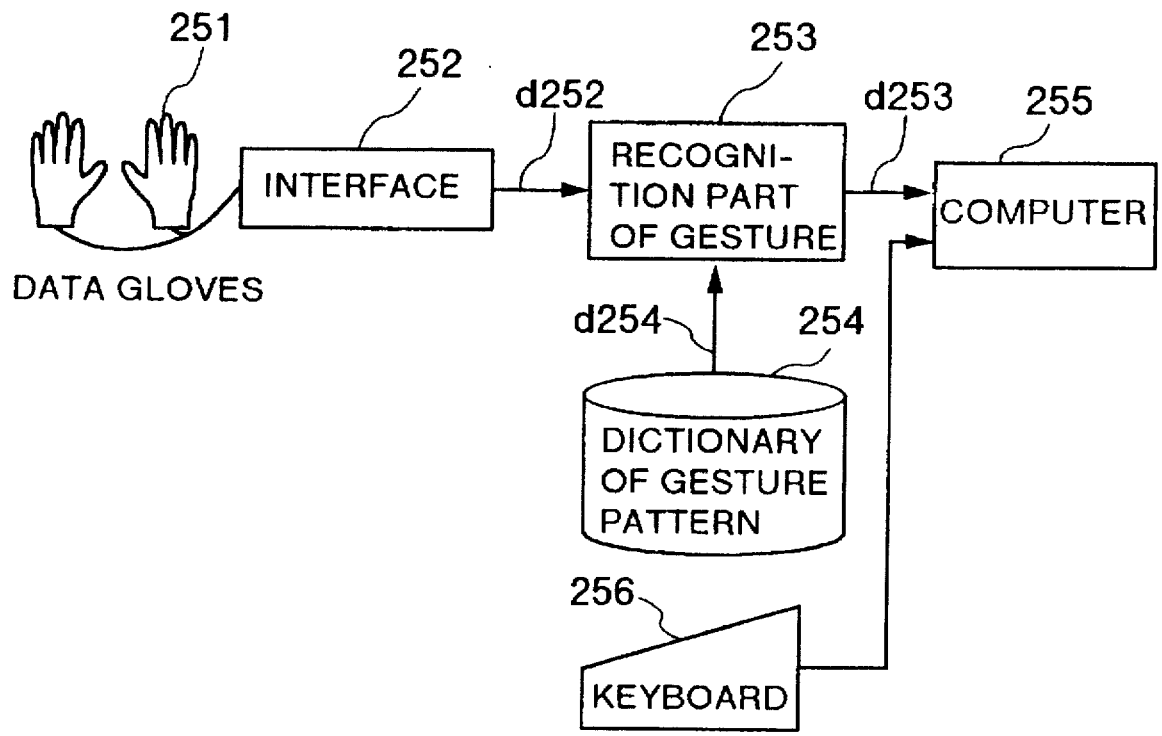
FIG. 25 is a block diagram showing a system which utilizes an input apparatus according to a fourth embodiment for operating a computer.

FIG. 25 is a block diagram showing a system for utilizing an input apparatus according to the present invention for operating a computer. A command represented by a gesture is inputted through a pair of data gloves 251 and an interface 252. With these devices, information on the gesture is converted to n-th order time-series sequential data d252. The converted data is inputted to a recognition part 253 of gesture which uses gesture patterns d254 described in a dictionary 254 of gesture pattern to recognize the gesture representing a command to be inputted to a computer 255. A keyboard 256 is further provided for directly inputting commands to operate the computer 255.

Figure 26:
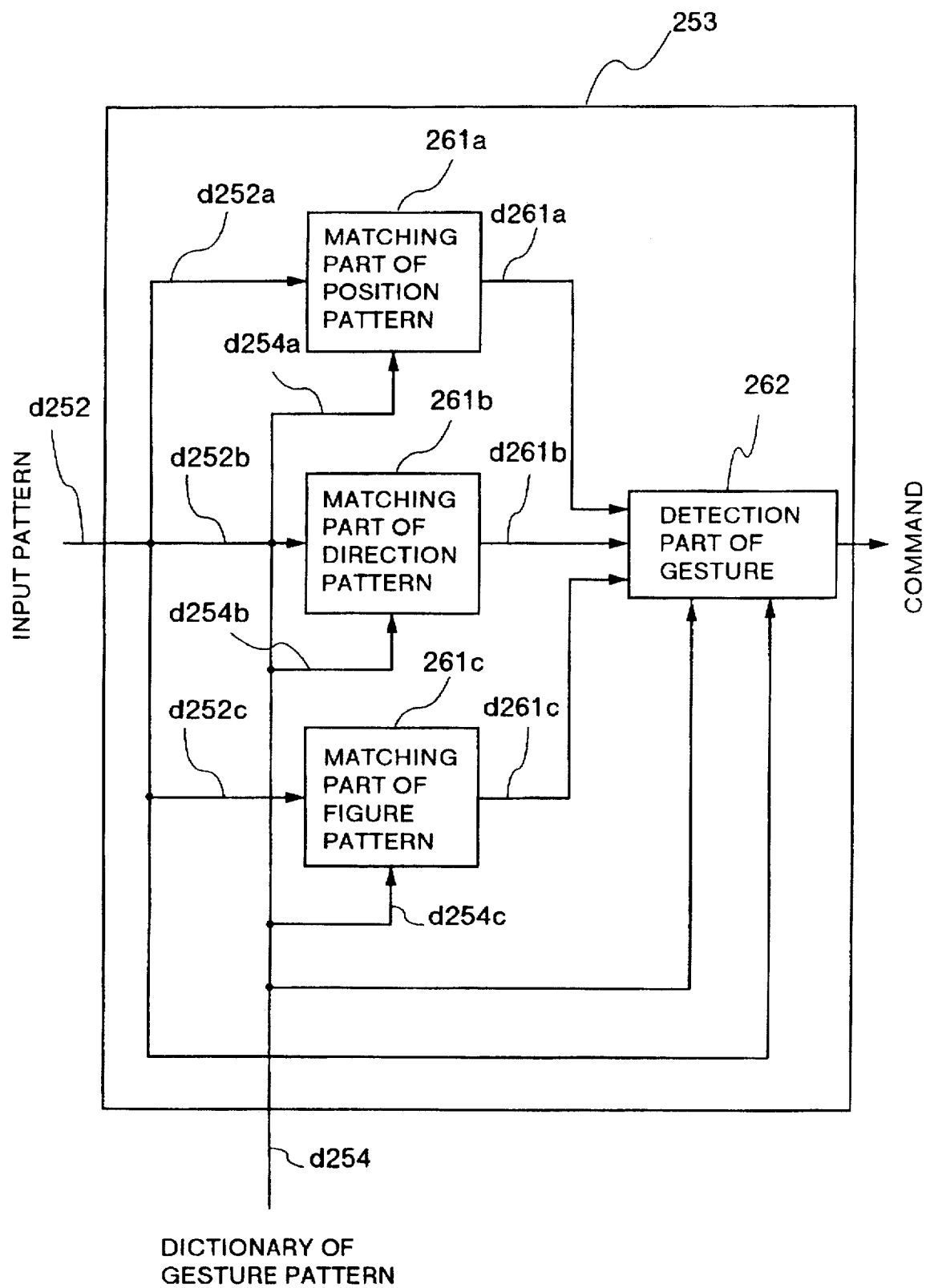
FIG. 26 is a block diagram showing the configuration of a recognition part 253 of gesture.

The recognition part 253 of gesture will be explained in detail with reference to FIG. 26. In the recognition part 253 of gesture, patterns "position of hand" d252a, "direction of palm" d252b, and "figure of hand" d252c representing an inputted gesture pattern d252 are supplied to a matching part 261a of position pattern, a matching part 261b of direction, and a matching part 261c of figure, respectively, where they are matched with position patterns d254a, direction patterns d254b, and figure patterns d254c stored in the dictionary 254 of gesture pattern. For the respective matching parts of the component patterns, the matching part shown in FIG. 5 may be used. It is required that the system enables the recognition part 253 of gesture to send, other than a command, additional information associated therewith to the computer 255 in order to realize flexible operations. Such additional information may be, for a command for instructing the computer 255 to execute a pointing operation, positional information indicative of a pointed location, or the like. For this purpose, a detection part 262 of gesture is required to be capable of simultaneously detecting a command as well as such additional information associated with the command. The registration in the dictionary 254 of gesture pattern is done in the form of the dictionary 214 of sign-language pattern shown in FIG. 14, and additional information is also described in the dictionary 254 as to what information is detected from which component pattern.

The format of gesture patterns described in the dictionary 254 of gesture pattern will be explained in detail with reference to FIG. 27. Described in the dictionary 254 of gesture pattern are a command name 271, a number 272 of gestures representing a command, and information 273 on respective actual gestures. As further information on the respective gestures, component data "figure of hand" 274, "direction of palm" 275, and "position of hand" 276 are also described in the dictionary 254 of gesture pattern. The respective component data is divided into data on the right hand and data on the left hand. For each hand data, kind of pattern 277 indicative of a static pattern or a dynamic pattern, and actual pattern data 278 corresponding to each pattern are described. Further, for detecting the additional information such as a pointed location, each hand data includes a description for specifying which data is calculated from gesture data. If any of the pattern kind description, the actual pattern data, and the additional information is not described for a particular hand data, the matching part is controlled so as not to refer to such absent data during the matching process or the detection of the additional information. FIG. 28 shows an exemplary description in the dictionary 254 of gesture pattern for defining a command which has no additional information. In this case, a command A is sent to the computer 255 by detecting a pattern representing a certain gesture at a particular location while maintaining particular figure of hand and direction of palm. FIG. 29 shows an exemplary description in the dictionary 254 of gesture pattern for defining a command which requires additional information. This command B is used when a particular location on a monitor of the computer is pointed by a finger pointing operation, or the like. As data for matching, only the component pattern "figure of hand" is stored. For the component patterns "position of hand" and "direction of palm", there are descriptions for instructing to calculate additional information. The data on the pattern "figure of hand", which represents a hand with an erected index finger, is an element determining that this is a finger pointing command. The addition information of the component patterns "position of hand" and "direction of palm" are utilized by the computer 255 as information representing the direction in which the index finger is pointing when the component pattern "figure of hand" representing this command is detected. By describing a command in this format, the matching with flexible descriptions can be achieved even for commands which do not depend on changes in a particular component and for the case where a change in a particular pattern causes the meaning of a command to change.

The operation of the detection part 262 of gesture will be explained in detail with reference to FIG. 30. First, in a calculation part 301 of overlap, an overlap of detected component patterns is found. In this event, since the three component patterns are not always sent depending on a command, an overlap is found for necessary component patterns in accordance with contents d254 described in the dictionary 254 of gesture pattern. With the command shown in FIG. 28, an overlap is found for all the three component patterns. Contrarily, with the command shown in FIG. 29, since detected data on the component pattern "figure of hand" only is sent, an overlap need not be found, so that the detected data is outputted from the calculation part 301 as it is. A decision part 303 of overlap determines whether the found overlap amount d301 is equal to or more than a threshold. If so, a comparison part 302 of position of overlap is driven. The comparison part 302 of position of overlap determines, for a gesture representing a command to be detected, whether a temporal relation between a gesture d301 detected at that time and a gesture d303 detected before that time is within a tolerance value. In a memory part 305, information on gestures detected before when new gesture is detected is stored. If no gesture information is stored in the memory part 305, detected gesture information is outputted as it is from the comparison part 302. A decision part 304 of command compares the detected gesture d304 and gesture information d305 stored in the memory part 305 with the contents d254 of the dictionary 254 of gesture pattern to determine whether a command is detected. If a command is detected, additional information is calculated in a calculation part 306 of additional information in accordance with a description in the dictionary 254 of gesture pattern. With the command shown in FIG. 29, "position of hand" and "direction of finger" are calculated from a part in the input pattern d252 corresponding to the command, and outputted from the calculation part 306.

The detected command and additional information associated therewith are sent to the computer 255 wherein the sent command and additional information are received by an application such that an operation is performed by the computer 255 in accordance with the command.

As described above, according to the present invention, for creating a template pattern of sign-language word, component patterns constituting the template pattern are classified into a static pattern and a dynamic pattern, and the static pattern is expressed by a vector representing the pattern to reduce a storage capacity required for storing template patterns of sign-language word. Also, component patterns constituting a template pattern of sign-language word are classified into a static pattern and a dynamic pattern, and different recognition methods are utilized for the static and dynamic patterns, respectively, whereby a recognition time can be shortened as compared with a conventional recognition method which employs one and the same recognition method for all patterns. Further, by separately matching component patterns constituting an input sign-language pattern with component patterns constituting template patterns of sign-language word, flexible recognition may be carried out even for the case where a displacement of the respective component patterns causes a degradation of the recognition accuracy, and for the case where the recognition accuracy is reduced due to a largely fluctuating component pattern. Since static patterns as well as dynamic patterns are in parallel matched before determining which patterns are valid, erroneous determination as to whether a pattern is static or dynamic is reduced, with the result that the recognition accuracy of the sign-language word can be improved.

We claim:

1. A continuous sign-language recognition apparatus comprising:

sign-language input means for converting a series of sign-language words into sign-language patterns which are time-series patterns of feature vectors and inputting said sign-language patterns;

a dictionary of template pattern of sign-language word for storing template patterns of sign-language word; and sign-language word recognition means coupled to said sign-language input means and said dictionary for matching said sign-language patterns with said template patterns of sign-language word to recognize sign-language words expressed in said sign-language patterns, each of said template patterns of sign-language word being expressed as a feature vector for the sign-language word having a static pattern, and as a time-series pattern of a feature vector for the sign-language word having a dynamic pattern;

each of said sign-language patterns and each of said template patterns of sign-language word being expressed as a combination of a plurality of component patterns; and each of said template patterns of sign-language word being expressed as a feature vector for the component pattern having a static pattern, and as a time-series pattern of a feature vector for the component pattern having a dynamic pattern;

said sign-language word recognition means includes matching portions of component pattern for matching the respective component patterns constituting one of said sign-language patterns with the component patterns constituting said template patterns of sign-language word, and a detection portion of sign-language word for integrating the matching results of said matching portions of component pattern to detect a sign-language word;

wherein each of said matching portions of component pattern includes:

selection means for determining whether each of the component patterns is static or dynamic with reference to said dictionary of template pattern of sign-language word;

static pattern detection means for matching one of said sign-language patterns with said template patterns of sign-language word, in response to a component pattern which is a static pattern, and outputting pattern detected positions; and dynamic pattern detection means for matching one of said sign-language patterns with said template patterns of sign-language word, in response to a component pattern which is a dynamic pattern, and outputting pattern detected positions.

2. A continuous sign-language recognition apparatus according to claim 1, wherein said each component pattern is weighted with a weighting coefficient indicative of an importance degree thereof with respect to the whole pattern, and pattern matching is performed using said weighting coefficient.

3. A continuous sign-language recognition apparatus according to claim 1, wherein said detection portion of sign-language word includes:

calculation means for calculating an overlap of the pattern detected positions of the respective component patterns outputted from said matching portions of component pattern; and decision means of overlap for determining the existence of one of said template patterns of sign-language word that is matched with one of said sign-language patterns, if the calculated overlap of the respective component patterns is equal to or more than a predetermined value.

4. A continuous sign-language recognition apparatus according to claim 3, wherein said decision means of overlap determines, when said component patterns are each constituted of a static pattern, that one of said template patterns of sign-language word is matched with one of said sign-language patterns, if the respective component patterns are detected within a predetermined time period.

5. A continuous sign-language recognition apparatus according to claim 3, wherein said detection portion of sign-language word includes a detection part of simultaneous gesture for detecting a simultaneous gesture in sign-language words from detection results of a plurality of sign-language word patterns, based on an overlap of said sign-language word patterns.

6. A continuous sign-language recognition system according to claim 1, wherein said template patterns of sign language word are expressed by a variation in the gesture element pattern and appended information indicative of a semantic variation of the gesture element pattern, and said sign-language word recognition means detects the variation of an expression or format of the gesture element pattern, and calculates and extracts appended information described in the template pattern.

7. A continuous sign-language recognition system comprising:

means for converting a series of sign-language words into sign-language patterns which are time-series patterns of feature vectors and inputting said converted sign-language patterns;

means for storing template patterns for sign-language words;

pattern matching means for matching said input sign-language patterns with said template patterns of sign-language word, to recognize a sign-language word expressed in said input sign-language patterns;

recognizing means responsive to said matching means for recognizing a sign-language word from the results of matching between the input sign-language pattern and the template patterns; and means for outputting the sign-language word recognized by said recognizing means;

each of said template patterns for sign-language words includes a description for identifying whether each of gesture elements each constituting a sign-language word is a static pattern or a dynamic pattern, and a pattern of the gesture element expressed as a format that is different depending upon whether the gesture element is a static pattern or a dynamic pattern;

said pattern matching means, referring to said template patterns in said storing means, selecting a relevant one of different matching schemes in accordance with whether each gesture element in the template patterns is static or dynamic and performing a matching of said input sign language patterns with the pattern of each gesture element using the selected matching scheme, independently from the other gesture elements; and said sign-language word recognizing means integrating recognition results of the gesture elements each constituting a sign-language word, based on a time relation with the recognition results.

8. A continuous sign-language recognition system according to claim 7, wherein the gesture element patterns of sign-language word in the template patterns is expressed as a feature vector for the sign-language word having a static pattern, and as a time-series pattern of a feature vector for the sign-language word having a dynamic pattern.

9. A continuous sign-language recognition system according to claim 7, wherein each of said gesture element patterns is weighted with a weighting coefficient indicative of an importance degree thereof with respect to the whole pattern, and pattern matching is performed using said weighting coefficient.

10. A continuous sign-language recognition system according to claim 7, wherein said sign-language word recognition means calculates an overlap of detection positions between gesture elements detected by the matching of the gesture element patterns, and determines that a sign-languages word corresponding to a template pattern matched with the input sign-language pattern is present, when the calculated overlap for inter-gesture elements exceeds a predetermined value.

11. A continuous sign-language recognition system according to claim 10, wherein when all of gesture element patterns constituting a sign-language word are static patterns, said sign-language word recognition means determines that a sign-language word corresponding to a template pattern matched with the input sign-language pattern is present in response to a detection of the detected gesture element within a predetermined time range.

12. A continuous sign-language recognition system according to claim 10, wherein said sign-language word recognition means detects concurrent operation in a sign language from detection results of a plurality of sign-language word patterns, based on an overlap thereof.

13. A continuous sign-language recognition system comprising:

means for converting a series of sign-language words into sign-language patterns which are time-series patterns of feature vectors and inputting said sign-language patterns;

pattern storage means for storing template patterns of sign-language morphemes;

word store means for storing sign-language words each expressed as a combination of sign-language morphemes constituting a sign-language word;

pattern matching means for matching said sign-language patterns with said template patterns of sign-language morphemes, in order to recognize sign-language morphemes expressed in said sign-language patterns;

morpheme recognition means responsive to said pattern matching means for recognizing sign-language morphemes from the results of matching between one of said sign-language patterns and the template patterns of sign-language morphemes;

word recognition means connected to said morpheme recognition means for recognizing a sign-language word by matching the recognized sign-language morphemes with a combination of sign-language morphemes constituting a sign-language word; and means for outputting the sign-language word recognized by said word recognizing means;

said template patterns stored in said sign-language morpheme template storing means including a description of identifying whether each of gesture elements constituting a sign-language morpheme is a static pattern or a dynamic pattern, and a pattern of the gesture element expressed as a format different depending upon whether the gesture element is a static pattern or a dynamic pattern;

said pattern matching means for matching the input sign-language patterns with the sign-language morpheme template patterns, referring to said template patterns in said pattern storage means, selecting a relevant one of different matching schemes in accordance with whether each gesture element in the template patterns is static or dynamic, and performing a matching of said sign language patterns with the pattern of each gesture element using the selected matching scheme, independently from the other gesture elements; and said morpheme recognition means integrating recognition results of the gesture elements each constituting a sign-language morpheme, based on a time relation with the recognition results to recognize the sign-language morpheme.

14. An input system comprising:

sign-language input means for converting a series of gestures into gesture patterns which are time-series patterns of feature vectors and inputting the converted gesture patterns;

storing means for storing template patterns of gestures;

matching means for matching the input gesture patterns with the template patterns of the gesture stored in said storing means, in order to recognize a gesture expressed in the gesture pattern;

gesture recognizing means responsive to said matching means for recognizing the gesture expressed in the gesture pattern, from the results of matching between the input gesture patterns and the template patterns; and means for performing a processing corresponding to the recognized gesture;

each of said gesture template patterns stored in said template pattern storing means including a description of identifying whether each of gesture elements constituting a gesture is a static pattern or a dynamic pattern, and a pattern of the gesture element expressed as a format different depending upon whether the each gesture element is a static pattern or a dynamic pattern;

said matching means for matching the input gesture patterns with the gesture template patterns, referring to said template patterns in said storing means, selecting a relevant one of different matching schemes in accordance with whether each of gesture elements in the template patterns is static or dynamic and performing a matching of said gesture patterns with the pattern of each gesture element using the selected matching scheme, independently from the other gesture elements; and said gesture recognizing means integrating recognition results of the gesture elements constituting a gesture, based on a time relation with the recognition results.

15. An input system according to claim 14, wherein the template of the gesture is expressed as a feature vector for the gesture having a static pattern, and as a time-series pattern of a feature vector for the gesture having a dynamic pattern.

16. An input system according to claim 14, wherein said gesture recognition means calculates an overlap of recognition (detection) positions between gesture elements recognized (detected) by the matching of the gesture element patterns, and determines that a gesture corresponding to a template pattern matched with the input gesture pattern is present, when the calculated overlap for inter-gesture elements exceeds a predetermined value.

17. An input system according to claim 16, wherein when all of gesture elements constituting a gesture are static patterns, said gesture recognizing means determines that a gesture corresponding to a template pattern matched with the input gesture pattern is present in response to a detection of the detected gesture element within a predetermined time range.

18. An input system according to claim 14, wherein the gesture template pattern is expressed by a pattern of gesture elements and an appended information indicative of data to be extracted from the gesture pattern; and said gesture recognizing means calculates and extract necessary data from the gesture pattern based on the recognition result of the gesture and the appended information in the template pattern.

* * * * *